(12) United States Patent
Shiraki

(10) Patent No.: US 11,782,615 B2
(45) Date of Patent: Oct. 10, 2023

(54) INFORMATION PROCESSING SYSTEM, NON-TRANSITORY COMPUTER-READABLE RECORDING MEDIUM HAVING STORED THEREIN STORAGE CONTROLLING PROGRAM, AND STORAGE CONTROLLER

(71) Applicant: FUJITSU LIMITED, Kawasaki (JP)

(72) Inventor: Osamu Shiraki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/061,596

(22) Filed: Oct. 2, 2020

(65) Prior Publication Data
US 2021/0157493 A1 May 27, 2021

(30) Foreign Application Priority Data
Nov. 22, 2019 (JP) .................. 2019-211317

(51) Int. Cl.
| | |
|---|---|
| G06F 12/00 | (2006.01) |
| G06F 13/00 | (2006.01) |
| G06F 3/06 | (2006.01) |
| G06F 15/173 | (2006.01) |

(52) U.S. Cl.
CPC ............ *G06F 3/0631* (2013.01); *G06F 3/067* (2013.01); *G06F 3/0613* (2013.01); *G06F 3/0653* (2013.01); *G06F 3/0659* (2013.01); *G06F 3/0683* (2013.01); *G06F 15/17331* (2013.01)

(58) Field of Classification Search
CPC .... G06F 3/0631; G06F 3/0613; G06F 3/0653; G06F 3/0659; G06F 3/067; G06F 3/0683; G06F 15/17331

USPC .......................................................... 711/154
See application file for complete search history.

(56) References Cited

U.S. PATENT DOCUMENTS

| | | | | |
|---|---|---|---|---|
| 5,546,539 A | * | 8/1996 | Poling | H04L 29/06 370/257 |
| 5,978,875 A | * | 11/1999 | Asano | G06F 13/362 709/200 |
| 6,252,821 B1 | * | 6/2001 | Nizar | G11C 8/10 711/217 |
| 6,839,777 B1 | * | 1/2005 | Vrancic | G06F 13/28 710/52 |

(Continued)

FOREIGN PATENT DOCUMENTS

| | | |
|---|---|---|
| JP | 2005-159430 A | 6/2005 |
| WO | 2003/075147 A1 | 9/2003 |

*Primary Examiner* — Sheng Jen Tsai
(74) *Attorney, Agent, or Firm* — Fujitsu Patent Center

(57) ABSTRACT

An information processing system includes a data processing apparatus and multiple storage apparatuses. The data processing apparatus stores, into a memory, write data to be written to a first storage apparatus, and sends, to the first storage apparatus, a first transfer request containing information of a storing location of the write data in the memory. The first storage apparatus executes a transfer process to read the write data from the storing location, and writes the write data to a first storage area in the first storage apparatus; sends, to a second storage apparatus, a second transfer request instructing a transfer of the write data from the memory to the second storage apparatus; and sends, to a third storage apparatus, a third transfer request instructing a transfer of the write data from the first storage area to the third storage apparatus.

14 Claims, 21 Drawing Sheets

(56) References Cited

U.S. PATENT DOCUMENTS

| | | | | |
|---|---|---|---|---|
| 8,156,261 | B2* | 4/2012 | Barry | G06F 13/126 |
| | | | | 712/225 |
| 8,700,845 | B1* | 4/2014 | Bowers | G11C 7/1003 |
| | | | | 711/E12.001 |
| 9,741,398 | B1* | 8/2017 | Leinwander | G11C 5/066 |
| 10,388,330 | B1* | 8/2019 | Leinwander | G11C 5/066 |
| 2005/0038850 | A1* | 2/2005 | Oe | G06F 3/067 |
| | | | | 709/203 |
| 2005/0111453 | A1* | 5/2005 | Mizutani | H04L 12/56 |
| | | | | 370/390 |
| 2006/0259662 | A1* | 11/2006 | Furukawa | G06F 13/28 |
| | | | | 710/40 |
| 2010/0185808 | A1* | 7/2010 | Yu | G06F 13/1684 |
| | | | | 713/193 |
| 2013/0166855 | A1* | 6/2013 | Batwara | G06F 9/5016 |
| | | | | 711/154 |
| 2013/0282983 | A1* | 10/2013 | Mills | G06F 3/0685 |
| | | | | 711/122 |
| 2014/0330767 | A1* | 11/2014 | Fowler | G06F 16/288 |
| | | | | 707/607 |
| 2015/0224845 | A1* | 8/2015 | Anderson | B60G 17/019 |
| | | | | 701/37 |
| 2017/0070073 | A1* | 3/2017 | Mohammed | H02J 7/0021 |
| 2018/0167519 | A1* | 6/2018 | Nakajima | H04N 1/00602 |
| 2018/0205242 | A1* | 7/2018 | Kelly-Morgan | H02J 7/0014 |
| 2020/0091564 | A1* | 3/2020 | Moen | H01M 10/654 |

\* cited by examiner

FIG.17 FIRST EXAMPLE OF COMPLETION NOTIFICATION PROCESS

INFORMATION PROCESSING SYSTEM, NON-TRANSITORY COMPUTER-READABLE RECORDING MEDIUM HAVING STORED THEREIN STORAGE CONTROLLING PROGRAM, AND STORAGE CONTROLLER

CROSS-REFERENCE TO RELATED APPLICATION

This application is based upon and claims the benefit of priority of the prior Japanese Patent Application No. 2019-211317, filed on Nov. 22, 2019, the entire contents of which are incorporated herein by reference.

FIELD

The present disclosure relates to an information processing system, a non-transitory computer-readable recording medium having stored therein a storage controlling program, and a storage controller.

BACKGROUND

A technique has been known which utilizes a plurality of information processing apparatuses, e.g., a plurality of servers, to configure a distributed storage system under the control of software.

Another technique has been also known which utilizes high-performance (high-speed) storage apparatuses so that remote storage apparatuses can be to be handled as if they were local storage apparatuses. One example of such a technique is, for example, NVMe over Fabrics (NVMe-oF) utilizing the Non-volatile Memory Express (NVMe).

Patent Document 1: Japanese Laid-Open Patent Publication No. 2005-159430

Patent Document 2: International Publication Pamphlet No. WO 2003/075147

As described above, because a distributed storage system is implemented by software, an overhead may arise during an access to a remote storage apparatus (e.g., remote server) in such a system.

In an exemplary situation, data is synchronized among multiple storage apparatuses in a distributed storage system. In this case, when a data write access to a remote storage apparatus is made, an overhead may arise during a synchronization process across multiple storage apparatuses, so that the processing delay of this write access may become longer than the delay of a write access to a local storage apparatus.

SUMMARY

According to an aspect of the embodiments, an information processing system may include a data processing apparatus and a plurality of storage apparatuses. The data processing apparatus may be configured to store, into a memory, write data to be written to a first storage apparatus of the plurality of storage apparatuses, and send, to the first storage apparatus, a first transfer request containing information indicative of a storing location of the write data in the memory. The first storage apparatus may be configured to execute a transfer process to read the write data from the storing location thereof in the memory based on the information indicative of the storing location, and write the write data to a first storage area in the first storage apparatus. The first storage apparatus may also be configured to send, to a second storage apparatus of the plurality of storage apparatuses, a second transfer request instructing a transfer of the write data from the storing location thereof in the memory to the second storage apparatus. The first storage apparatus may also be configured to send, to a third storage apparatus of the plurality of storage apparatuses, a third transfer request instructing a transfer of the write data from the storing location of the write data in the first storage area to the third storage apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Figure 1:
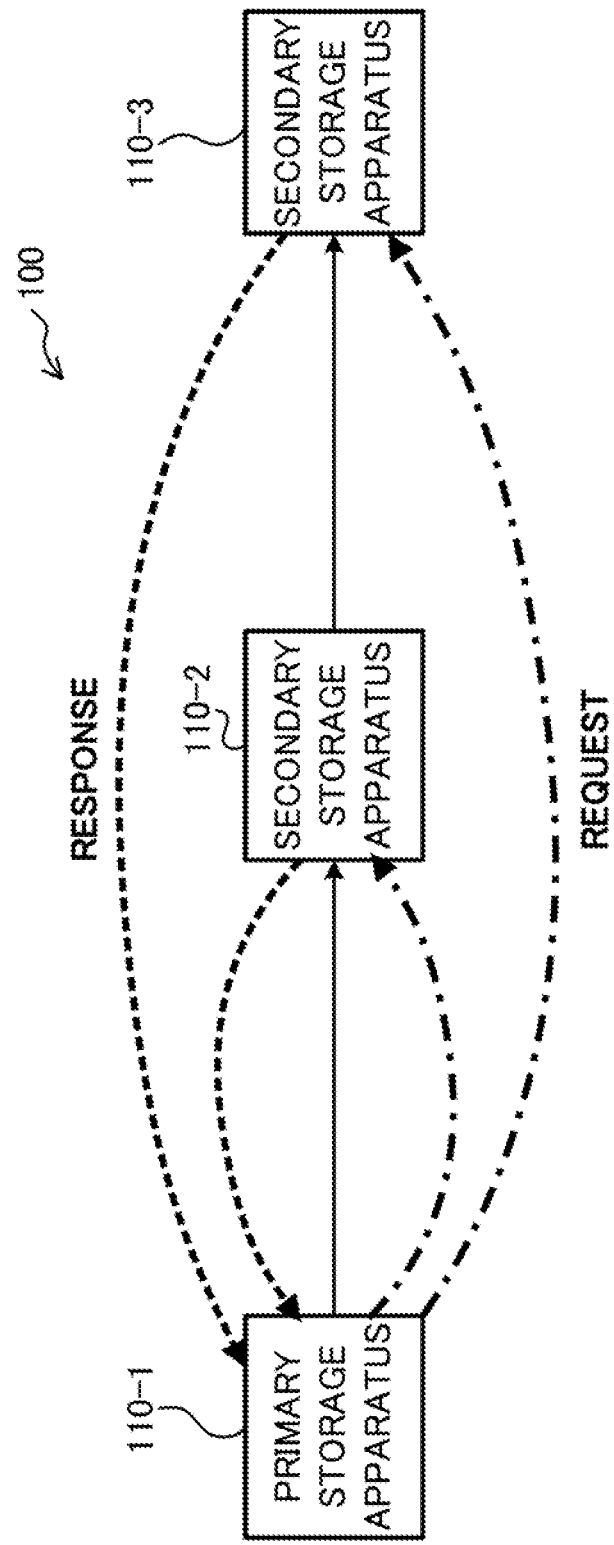
FIG. 1 is a diagram depicting an exemplary operation of a distributed storage system.

Hereinafter, embodiments of the present disclosure will be described with reference drawings. Note that the embodiments that will be described are merely exemplary, and it is not intended to exclude various variations and applications of techniques that are not described. For example, the present embodiments may be modified in various forms without departing from the scope thereof. In the drawings used in the following description, elements denoted by the like reference symbol denote the same or similar elements unless otherwise stated.

(1) One Embodiment (1-1) Distributed Storage System

FIG. 1 is a diagram depicting an exemplary operation of a distributed storage system 100. As exemplified in FIG. 1, the distributed storage system 100 includes a plurality of storage apparatuses 110-1 to 110-3 (in the following description, reference symbols 110 are simply used when no distinction is made on reference symbols 110-1 to 110-3). The storage apparatuses 110 are communicably connected to each other and are each configured to read and write data in response to a request from an upper-level component.

In the distributed storage system 100, a single piece of data, which is a unit of storage (unit of management), is stored, and one or more replicas (copies) are created for each piece of data and are managed by different storage apparatuses 110.

In one embodiment, each piece of data, which is a unit of storage, may be an "object". Thus, the distributed storage system 100 may also be referred to as the "object storage system" in one embodiment. It is to be noted a piece of data, which is a unit of storage, is not limited to an object, and may be a block, a file, or the like.

In the distributed storage system 100, one of the plurality of storage apparatuses 110 serves as a primary storage apparatus 110-1 (see FIG. 1) that stores an original object. On the other hand, storage apparatuses 110 that store replicas of the object retained in the primary storage apparatus 110-1 serve as secondary storage apparatuses 110-2 and 110-3 (see FIG. 1). Whether a given storage apparatus 110 serves as the primary or the secondary differs for each object.

The primary storage apparatus 110-1 maintains deployment information indicative of which secondary storages 110-2 and 110-3 control which replicas of an object managed by the primary storage apparatus 110-1. An upper-level component, e.g., a client, sends an access request for an object of data to the primary storage apparatus 110-1 that maintains the deployment information. Examples of the access request include a request for a write access (write request or write command) and a request for a read access (read request or read command).

Note that the client may retain information indicating which storage apparatus 110 serves as the primary for each object, and may identify a storage apparatus 110 to send an access request based on the information.

As illustrated in FIG. 1, in response to receiving a write request, for example, the primary storage apparatus 110-1 writes an object to a storage area in the primary storage apparatus 110-1. When the write completes, the primary storage apparatus 110-1 transfers a write request to (the plurality of) the secondary storage apparatuses 110-2 and 110-3. In response to the write request, the secondary storage apparatuses 110-2 and 110-3 each write the object (a replica thereof) to respective storage areas in the secondary storage apparatuses 110-2 and 110-3. When the writes complete, the secondary storage apparatuses 110-2 and 110-3 notify the primary storage apparatus 110-1 of a completion response.

Figure 2:
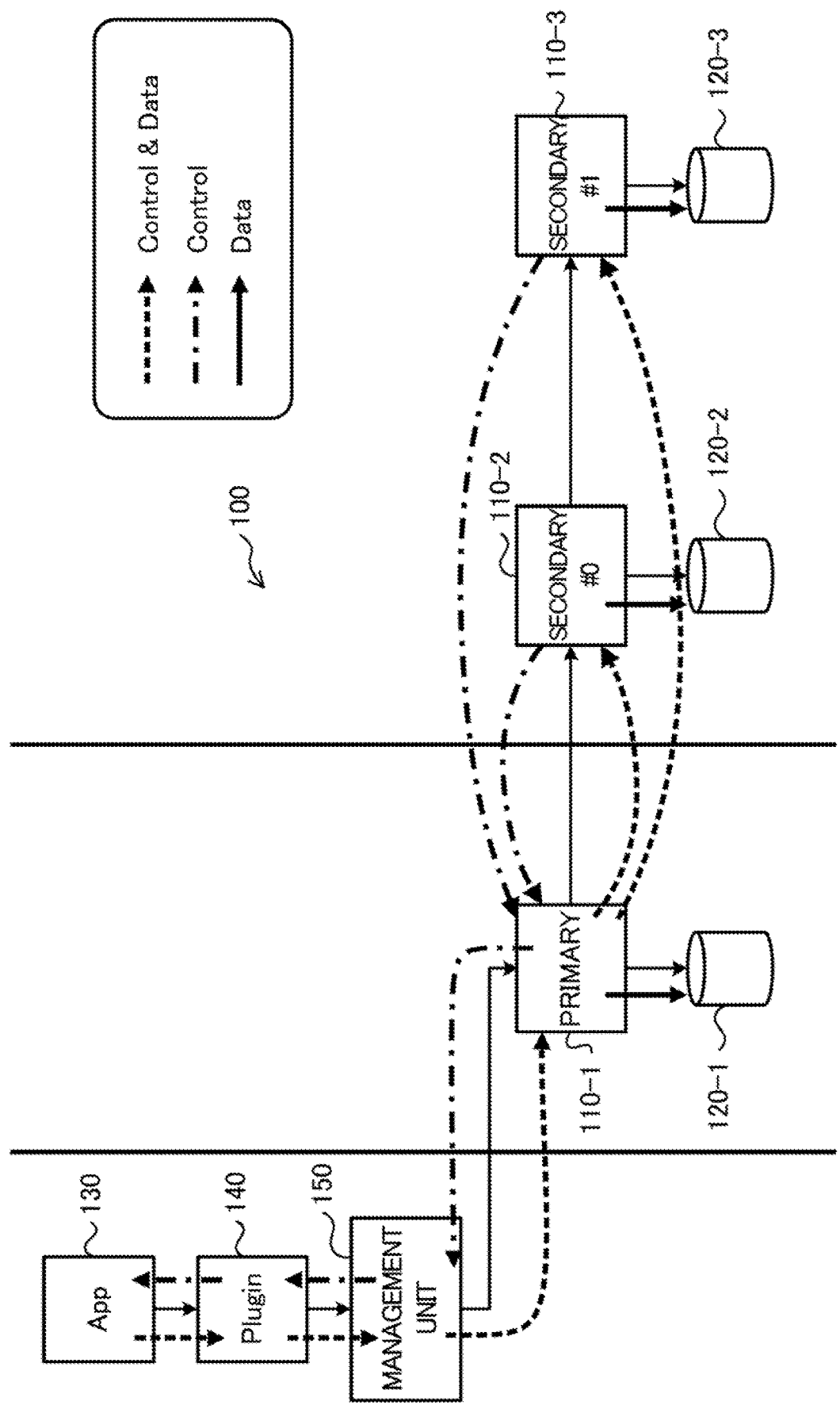
FIG. 2 is a diagram depicting exemplary flows of commands and data in a distributed storage system.

FIG. 2 is a diagram depicting exemplary flows of commands (control signals; labeled as "Control" in FIG. 2) and data (labeled as "Data" in FIG. 2) in the distributed storage system 100. In FIG. 2, the primary storage apparatus 110-1 is labeled as "PRIMARY", and the secondary storage apparatuses 110-2 and 110-3 are each labeled as "SECONDARY".

As illustrated in FIG. 2, in a write process, a write command and data are transferred from an application (labeled as "App" in FIG. 2) 130 to the primary storage apparatus 110-1 via a plugin (labeled as "Plugin" in FIG. 2) 140 and a management unit 150. In the example of FIG. 2, the flows of the write command and data are indicated by the dashed line arrows.

The application 130 is software that utilizes the distributed storage system 100, and the plugin 140 is software that supports the application 130 to utilize the distributed storage system 100. The management unit 150 is a function that makes the storage apparatuses 110 open to the plugin 140.

As illustrated in FIG. 2, the primary storage apparatus 110-1 writes data to a device 120-1 (see the bold solid line arrow) and sends a write command and the data to the secondary storage apparatuses 110-2 and 110-3 that store replicas (see the dashed line arrows). Once the secondary storage apparatuses 110-2 and 110-3 copy the data to respective devices 120-2 and 120-3 (see the bold solid line arrows), respective control commands notifying completion are sent from the secondary storage apparatuses 110-2 and 110-3 to the application 130 (see the dashed-dotted line arrows).

The devices 120-1 to 120-3 are each virtual (logical) storage devices that provide storage apparatuses 110-1 to 110-3 with storage areas, respectively.

As illustrated in FIG. 2, because data flows among the plurality of storage apparatuses 110 (modules) in the distributed storage system 100, access processes, particularly write processes, are accompanied by large latencies (delays).

Here, latencies exemplified in FIG. 2 could be reduced by transferring data in the distributed storage system 100 by means of RDMAs. For example, in FIG. 2, it is contemplated that data is transferred from the primary storage apparatus 110-1 to the secondary storage apparatuses 110-2 and 110-3 (the data is written to the devices 120-2 and 120-3) by means of RDMAs.

A remote direct memory access (RDMA) is a function (technique) to allow data to be copied between two nodes (between the storage apparatuses 110 or the devices 120 in the example of FIG. 2) without requiring any intervention by a processor, such as a central processing unit (CPU).

For achieving data transfers between the storage apparatuses 110 by means of RDMAs, the primary storage apparatus 110-1 maintains storage information e.g., metadata, about the remotes (the secondary storage apparatuses 110-2 and 110-3). The metadata may include, for example, respective storing addresses of pieces of data stored in each storage apparatus 110. Thus, in the distributed storage system 100 exemplified in FIG. 2, when data is attempted to be transferred by means of RDMAs, the processing load on the primary storage apparatus 110-1 increases, resulting in a processing delay.

Figure 3:
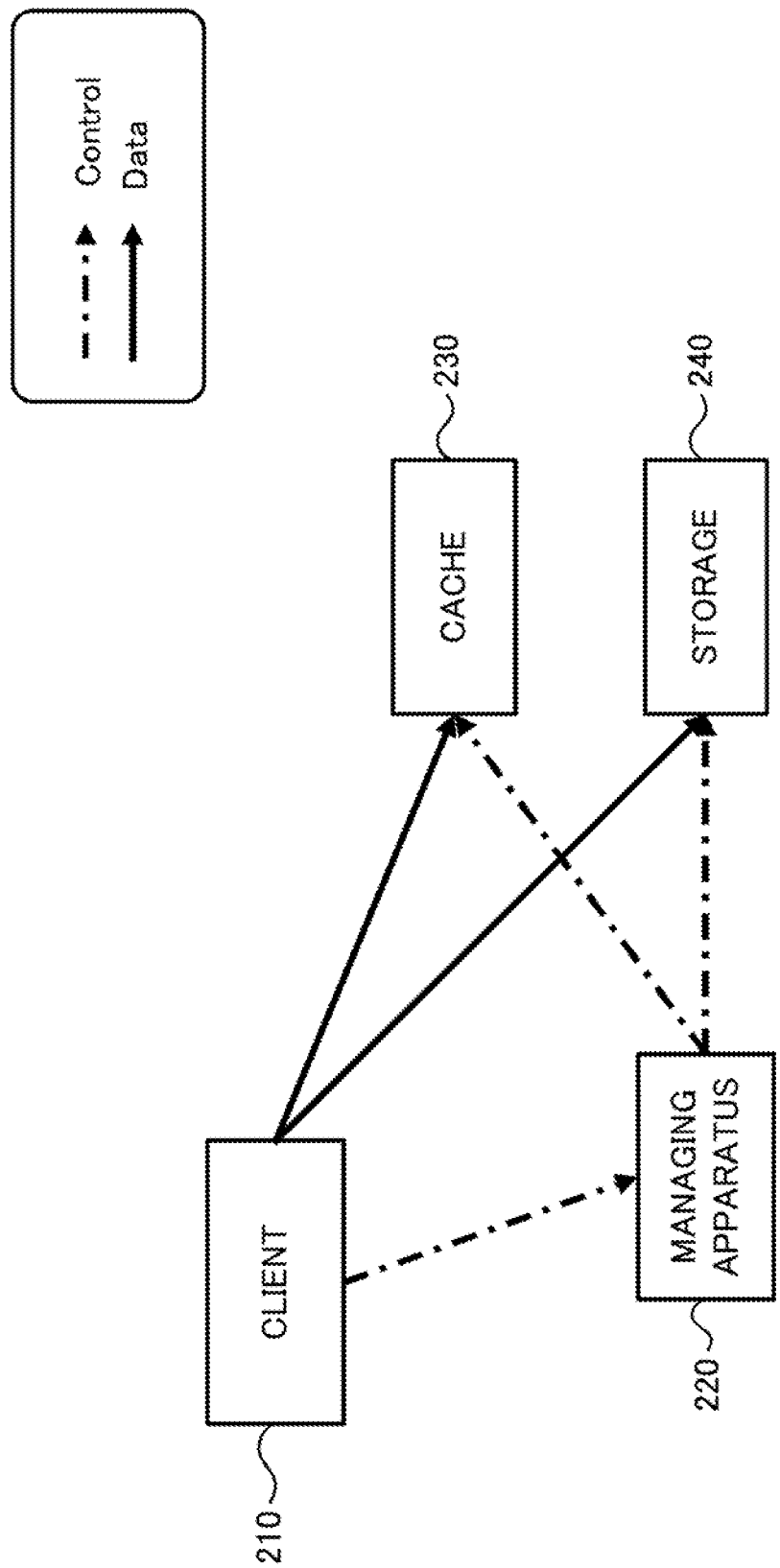
FIG. 3 is a diagram depicting an exemplary operation of a managing apparatus that mediates requests from a client.

It is also contemplated that the configuration exemplified in FIG. 3 may be applied to the distributed storage system 100. In the example of FIG. 3, a managing apparatus 220 that mediates requests from a client 210 transfers a command to a cache 230 or a storage 240 retaining actual data, so that the data is directly sent and received between a transfer destination and the client by means of an RDMA.

When the configuration exemplified in FIG. 3 is applied to the distributed storage system 100, the managing apparatus 220 maintains deployment information similar to the deployment information in the primary storage apparatus 110-1. In this configuration, a command sent from the client 210 contains an address of a storage area of data, so that the client 210 sends or receives the data in that address. A remote (the cache 230 or the storage 240 in the example of FIG. 3) transfers the data to or from a storage area in the remote. This eliminates the need to maintain storage information, such as metadata, of the remotes (the secondary storage apparatuses 110-2 and 110-3) in the primary storage apparatus 110-1, which can prevent an increase in the processing load.

When the configuration exemplified in FIG. 3 is applied to the distributed storage system 100, however, the client 210 including the application 130 illustrated in FIG. 2 will carry out a replication by means of RDMAs (data transfers for replicas).

Figure 4:
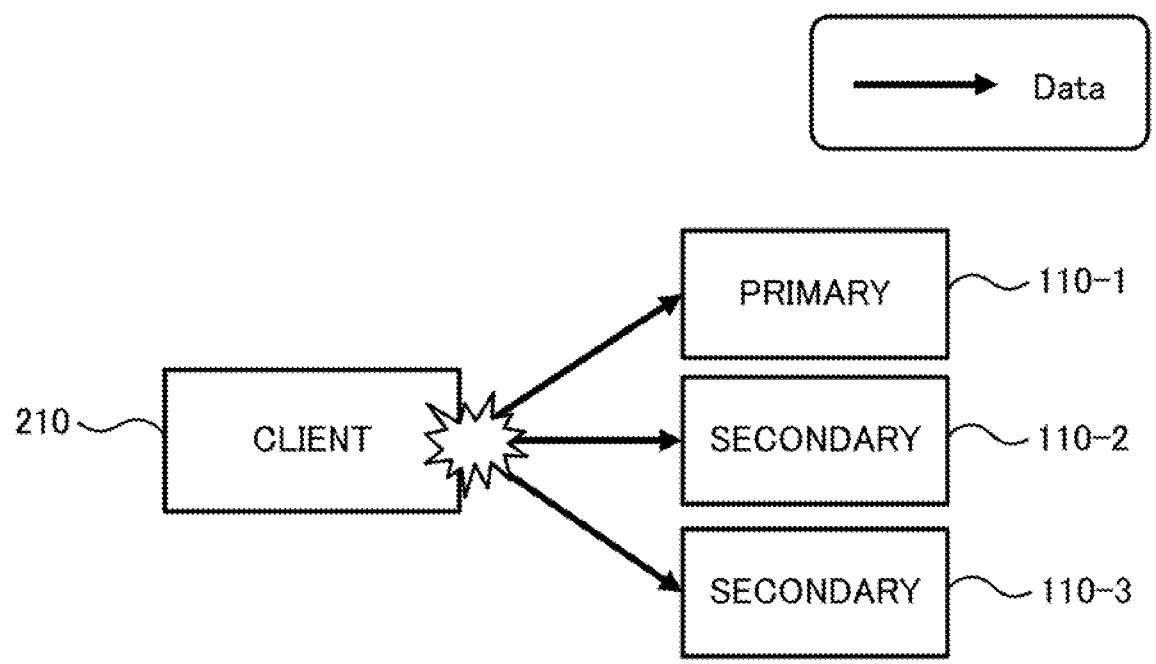
FIG. 4 is a diagram illustrating an example of a replication by a client.

FIG. 4 is a diagram illustrating an example of a replication by the client 210. As exemplified in FIG. 4, the client 210 carries out a data transfer to the primary storage apparatus 110-1 and replications to the secondary storage apparatuses 110-2 and 110-3 by means of RDMAs.

For example, as illustrated in FIG. 4, because three accesses to the primary storage apparatus 110-1 and the secondary storage apparatuses 110-2 and 110-3 are concentrated on the client 210, the transfer rates of the respective accesses reduce to about one-third of the maximum transfer rate of the client 210. Further, the transmission bandwidth of the client 210 is used up (occupied) until transfers for the three accesses complete.

In addition, RDMAs speed up the data transfers, which may generate processing overheads, such as overheads for sending control commands.

For example, some storage apparatuses, such as Serial Advanced Technology Attachment (SATA) based solid state drives (SSDs), have access speeds that are about one-thousandth of access speeds of memories, such as dynamic random access memories (DRAMs). Accordingly, in relation to a data transfer involving a storage apparatus, the likelihood of occurrence of an overhead is small in a process involving a memory.

In the meantime, low-latency SSDs utilizing next-generation memory technologies have emerged recently. As low-latency SSDs, the Intel® Optane™ SSD utilizing 3D XPoint™ technology is known, for example. Low-latency SSDs adopt NVMe interfaces (IFs), thereby achieving access speeds of about 100 times slower than access speeds of memories. With the advent of such low-latency SSDs, the speed difference between a storage apparatus and a memory is reduced. Accordingly, acceleration of data transfers by means of RDMAs has increased the likelihood of an overhead of a process involving a memory.

As set forth above, in the techniques described with reference to FIGS. 1 to 4, a processing delay or a reduction in the processing performance may arise during a data access, e.g., a replication, in the distributed storage system 100.

To address this issue, one embodiment provides a technique for improving the efficiency of data accesses in a storage system in which data is stored across a plurality of storage apparatuses in a distributed manner, and the technique will be described.

Figure 5:
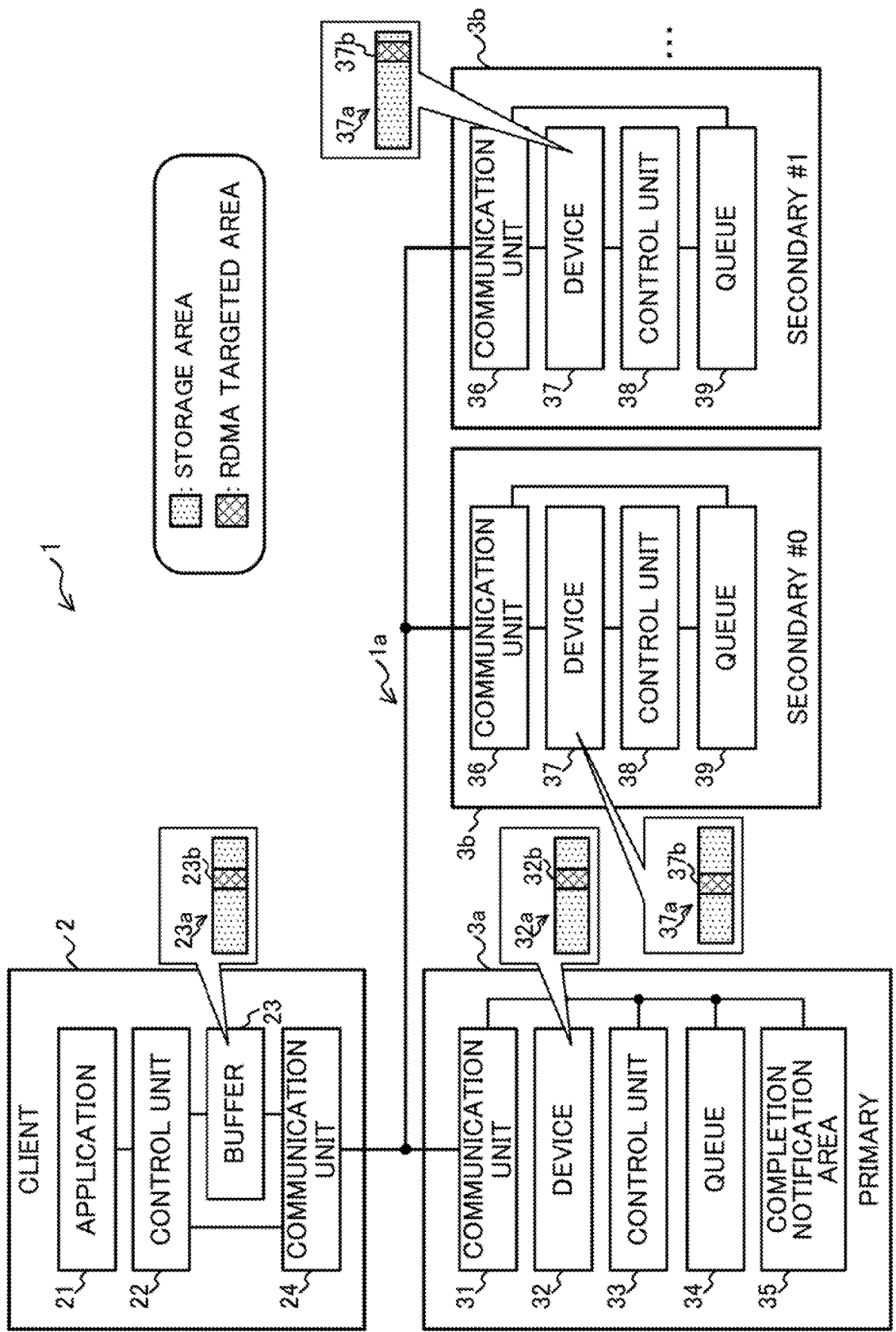
FIG. 5 is a block diagram illustrating an exemplary functional configuration of a distributed storage system according to one embodiment.

(1-2) Exemplary Functional Configuration of Distributed Storage System According to One Embodiment FIG. 5 is a block diagram illustrating an exemplary functional configuration of a distributed storage system 1 according to one embodiment. The distributed storage system 1 is an example of an information processing system, and may include, as an example, a client 2, a primary storage apparatus 3a, and a plurality of (two in FIG. 5) secondary storage apparatuses 3b, as illustrated in FIG. 5.

Hereafter, the primary storage apparatus 3a may be referred to as the "primary 3a", and the secondary storage apparatuses 3b may be referred to as the "secondary 3b" or "secondaries 3b". When no distinction is made between the primary 3a and the secondaries 3b, they may be referred to as the "storage apparatus 3" or "storage apparatuses 3". Further, when the two secondaries 3b are distinguished from each other, they may be referred to as the "secondary #0" and the "secondary #1", as illustrated in FIG. 5.

The primary 3a is an example of a first storage apparatus, the secondary #0 is an example of a second storage apparatus, and the secondary #1 is an example of a third storage apparatus.

Each of the client 2 and the storage apparatuses 3 is an example of a node. A node according to one embodiment may be a logical module provided by the distributed storage system 1 in which hardware (HW) resources in a plurality of computers are integrated by software.

The distributed storage system 1 may be capable of transferring data among a plurality of nodes by means of a technique such as the NVMe-oF, for example, in a manner similar to data transfers to remotes. For example, the distributed storage system 1 transfers data between the storage apparatuses using a data transfer technique, such as an RDMA, between the client 2 and a storage apparatus 3 and between the storage apparatuses 3. Examples of the storage apparatuses include wide variety of devices, such as storages e.g., SSDs and hard disk drives (HDDs), volatile memories e.g., DRAMs, and non-volatile memories e.g., persistent memories (PMs). In one embodiment, low-latency SSDs, such as NVMe SSDs, may be used as the storages.

The client 2 is an example of a data processing apparatus configured to access an object storage provided by the distributed storage system 1. The client 2 may access the object storage in response to a request for an access from another information processing apparatus (requesting information processing apparatus), such as a personal computer (PC) and a server.

As illustrated in FIG. 5, the client 2 may include, as an example, an application 21, a control unit 22, a buffer 23, and a communication unit 24.

The application (hereinafter, referred to as the "App") 21 is software that utilizes the distributed storage system 1, and carries out an access to, such as a write or read of, data (e.g., an object). For example, the App 21 issues a write command and write data, or issues a read command.

The buffer 23 is an example of a memory, and is configured to store data associated with an access by the App 21. The buffer 23 may be a storage apparatus such as a storage, a volatile memory, and a nonvolatile memory as described above, and may use a storage apparatus that is accessible using a data transfer technique, such as an RDMA.

The control unit 22 embeds (adds) the location of the data in (to) the command issued from the App 21, and sends the modified command to the communication unit 24.

For example, when the command is a write command, the control unit 22 stores the data to be written, i.e., write data, in an unused area in a storage area 23a in the buffer 23, and adds, to the write command, information indicative of the storing location of the write data in the storage area 23a, as the location of the data.

The App 21 may carry out a process to store the write data in an unused area in the buffer 23, in place of the control unit 22. In such a case, the App 21 may notify the control unit 22 of information indicative of the storing location.

Further, when the command is a read command, the control unit 22 adds, to the read command, information indicative of the storing location to store the result (read data) of a process according to the read command, in a storage area 23a in the buffer 23, as the location of the data.

Examples of the information indicative of the storing location include an address or a pointer that specifies the start position of a storage area 23b of write data or read data in the storage area 23a, for example. The information indicative of the storing location may also include the data size of the write data or the read data.

The communication unit 24 is communicatively connected to each of the storage apparatuses 3 via a network 1a, and is configured to send, to the storage apparatuses 3, commands associated with accesses. The communication unit 24 may supports RDMAs.

As described above, the control unit 22 and the communication unit 24 are examples of a sending unit configured to store, into the buffer 23, write data to be written to the first storage apparatus 3a of the plurality of storage apparatuses 3, and send, to the first storage apparatus 3a, a first transfer request containing information indicative of the storing location of the write data in the buffer 23.

The network 1a may include a public network, a private (e.g., cluster) network, or a combination of these. The network 1a may be a local area network (LAN), such as Infiniband® and Ethernet® networks, or a network compliant with to a storage area network (SAN), such as the Fibre Channel (FC), for example.

The storage apparatus 3 may be provided to each logical storage apparatus, and may store one or more objects. Accordingly, the storage apparatus 3 is an example of a storage controller configured to control a storing device (device 32 or 37 to be described later) or the storage apparatus 3 per se.

For an object, when the original of the object is stored in the storage apparatus 3, that storage apparatus 3 may function as the primary 3a storing the original of the object, or when an replica of the object is stored in the storage apparatus 3, that storage apparatus 3 may function as the secondary 3b storing the replica of that object. In the example of FIG. 5, the functional configuration of the primary 3a is illustrated so as to be distinct from the functional configurations of the secondaries 3b. However, the storage apparatuses 3 may each have both the functions of the primary 3a and the secondaries 3b, and either of duplicated functions may be omitted in such a case.

As illustrated in FIG. 5, the primary 3a may include, as an example, a communication unit 31, a device 32, a control unit 33, a queue 34, and a completion notification area 35.

The communication unit 31 is communicatively connected to each of the client 2 and the secondaries 3b via the network 1a, and configured to send, to the client 2 and the secondaries 3b, commands associated with accesses. The communication unit 31 may supports RDMAs.

The device 32 is an example of a first storage area, and may be embodied by HW resources, e.g., storage areas in storage apparatuses provided in a plurality of computers. Such a storage apparatus may be a storage apparatus such as a storage, a volatile memory, or a nonvolatile memory as described above, and may use a storage apparatus that is accessible using a data transfer technique, such as an RDMA. For example, the device 32 may be at least a part of storage areas in a virtual shared storage in which storage apparatuses in a plurality of computers are integrated under the control of software.

The control unit 33 generates an RDMA command based on a write command or a read command received by the communication unit 31, and stores the generated RDMA command into the queue 34. Examples of the RDMA command include an RDMA Read command and an RDMA Write command, for example. The formats (structures) of the RDMA Read command and the RDMA Write command may be the similar to those of well-known ones. The details of RDMA commands will be described later.

Further, the control unit 33, in response to detecting completion of an RDMA process according to the RDMA command, may execute the following processes, depending on the type of the RDMA processing.

(In the Case of RDMA Write Process According to RDMA Write Command)

In response to detecting completion of an RDMA Write process, the control unit 33 sends a completion response of a process associated with a read command to the client 2 via the communication unit 31.

(In the Case of RDMA Read Process According to RDMA Read Command)

In response to receiving a detection of completion of an RDMA Read process, the control unit 33 carry out a replication. For example, during the replication, the control unit 33 initializes the completion notification area 35, and sends a write command received from the client 2, to the two secondaries 3b via the communication unit 31.

Note that the control unit 33 stores the deployment information (not illustrated) indicative of which replicas of data stored in the local device 32 are to be stored in which secondaries 3b, as described above. Thus, the control unit 33 may identify the particular secondary 3b to which the write command is to be sent, based on the deployment information.

For example, in response to detecting completion of an RDMA Read process based on the content of the notification from the secondary 3b to the completion notification area 35, the control unit 33 sends a completion response for the process associated with the write command to the client 2 via the communication unit 31.

The queue 34 may be a storage area having the first-in first-out (FIFO) structure. The queue 34 may be embodied, for example, by a HW resource, e.g., at least a part of storage areas in memories provided in a plurality of computers.

The completion notification area 35 may be embodied by an HW resource, such as at least a part of storage areas in memories provided in a plurality of computers, for example. Details of detection of completion of an RDMA Read process using the completion notification area 35 will be described later.

As illustrated in FIG. 5, each secondary 3b may include, as an example, a communication unit 36, a device 37, a control unit 38, and a queue 39. The structures of the device 37 and the queue 39 are similar to the structures of the device 32 and the queue 34 in the primary 3a, respectively. The device 37 in the secondary #0 is an example of a second storage area, and the device 37 in the secondary #1 is an example of a third storage area.

The communication unit 36 is communicatively connected to the client 2, the primary 3*a*, and the other secondary 3*b* via the network 1*a*, and is configured to send, to the client 2 and the primary 3*a*, commands associated with accesses. In another configuration of the distributed storage system 1 described later, the communication unit 36 may also send commands associated with accesses, to the other secondary 3*b*. The communication unit 36 may supports RDMAs.

The control unit 38 issues an RDMA Read command based on a write command received by the communication unit 36 from the primary 3*a*, and stores the generated RDMA Read command into the queue 39. Details of the RDMA Read command issued by the control unit 38 will be described later.

Further, in response to detecting completion of an RDMA Read process according to an RDMA Read command, the control unit 38 notifies the completion notification area 35 in the primary 3*a* of the completion of the process associated with the write command via the communication unit 36. Details of the technique to notify the completion notification area 35 will be described later.

(1-3) Exemplary Operations

Next, referring FIGS. 6 to 19, exemplary operations of the distributed storage system 1 according to one embodiment will be described.

(1-3-1) Exemplary Operation of Write Access

Figure 13:
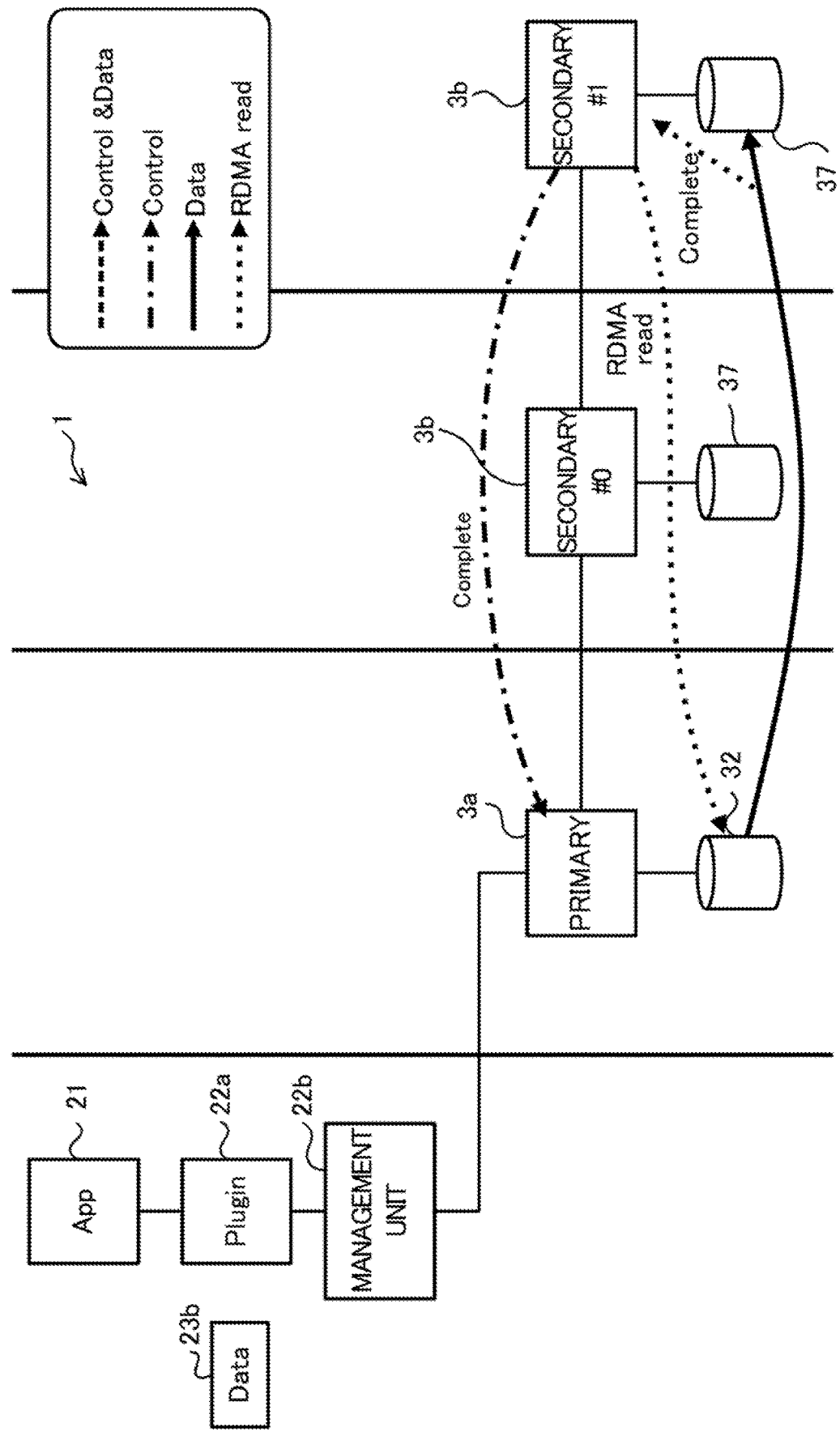
FIG. 13 is a diagram more specifically depicting the exemplary operation of the process illustrated in FIG. 11.
Figure 14:
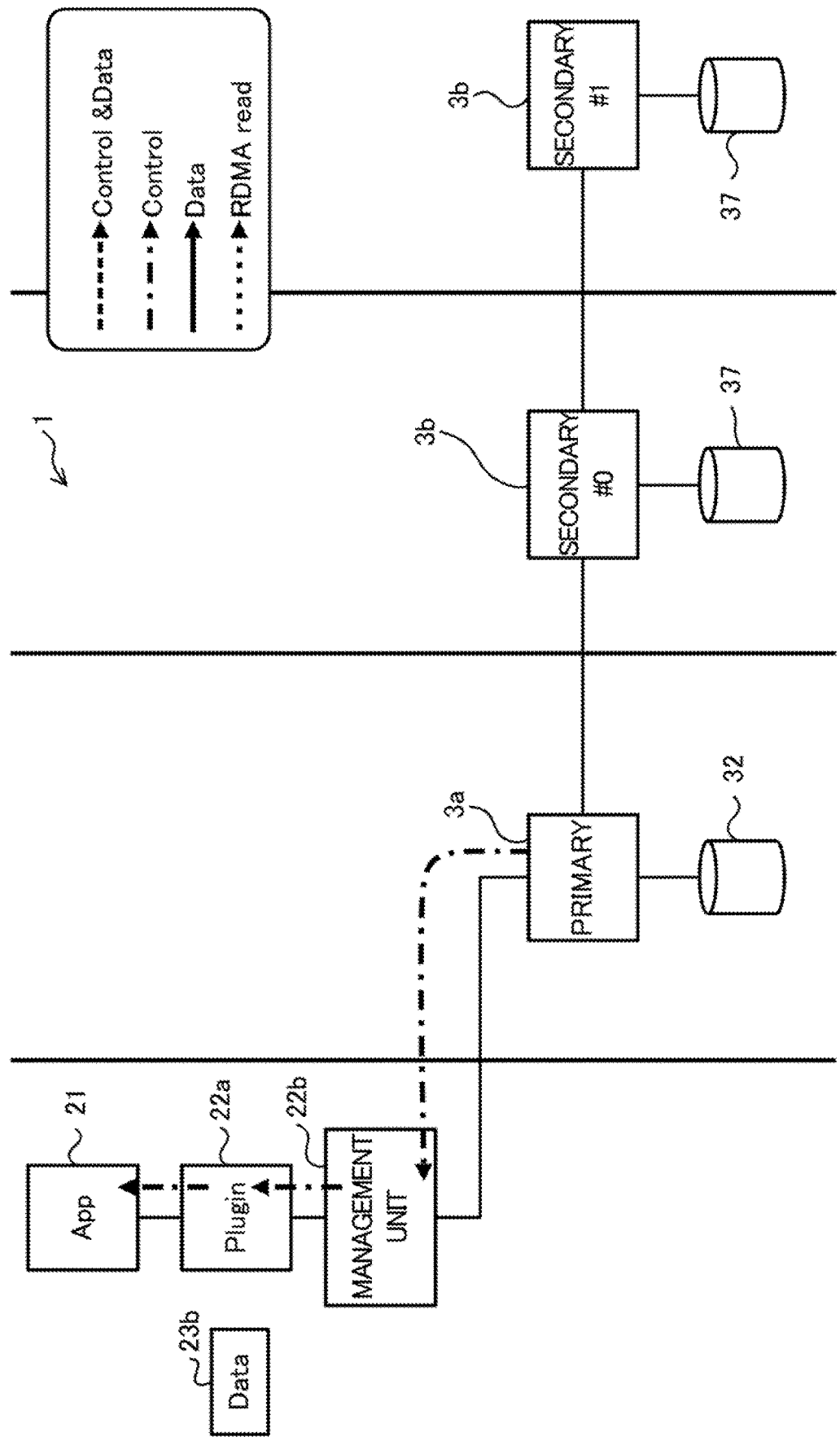
FIG. 14 is a diagram more specifically depicting the exemplary operation of the process illustrated in FIG. 11.
Figure 15:
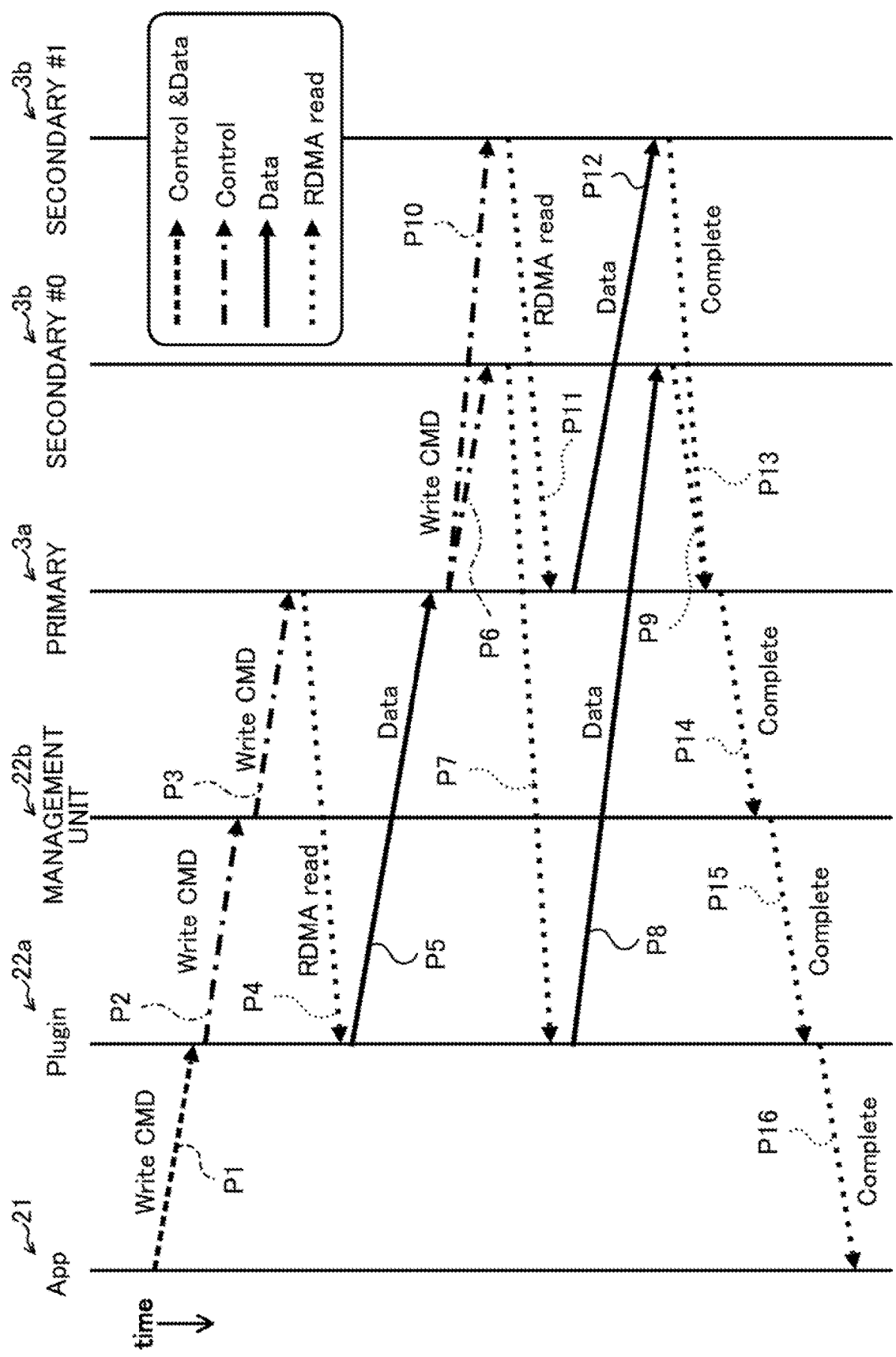
FIG. 15 is a sequence diagram depicting an exemplary operation of a write access in a distributed storage system.
Figure 16:
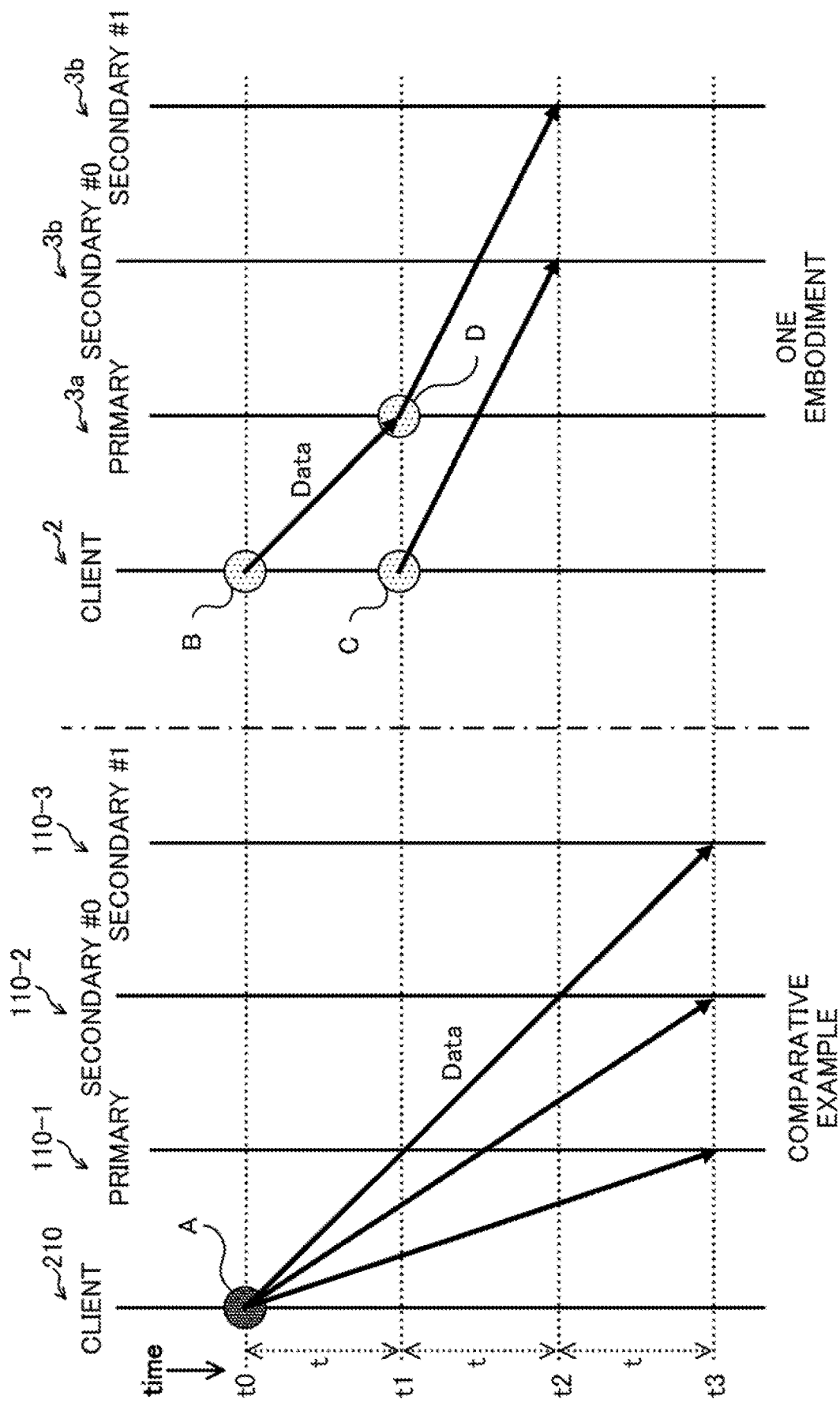
FIG. 16 is a diagram illustrating an example of a time chart of a write access according to one embodiment.

FIGS. 6 to 14 are diagrams depicting an exemplary operation of a write access in the distributed storage system 1 according to one embodiment, and FIG. 15 is a sequence diagram depicting an exemplary operation of a write access in the distributed storage system 1. FIG. 16 is a diagram illustrating an example of a time chart of a write access according to one embodiment.

Figure 6:
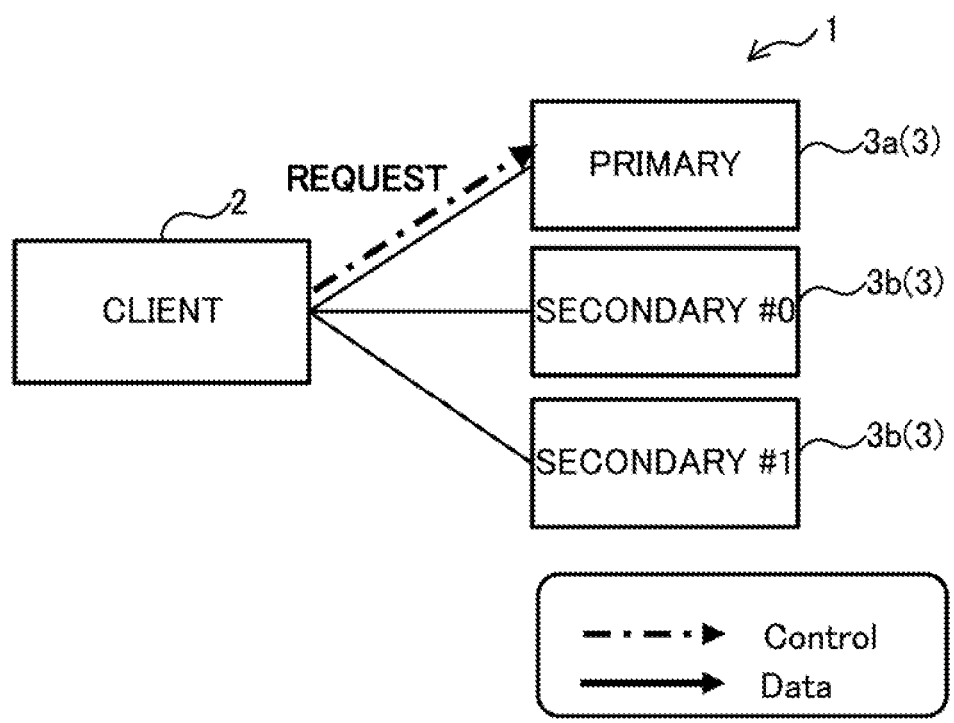
FIG. 6 is a diagram depicting an exemplary operation of a write access in a distributed storage system according to one embodiment.

As illustrated in FIG. 6, the client 2 sends a write command (request) to the primary 3*a*. The write command may include information indicative of the storing location of write data in the storage area 23*a* in the buffer 23 in the client 2.

Figure 7:
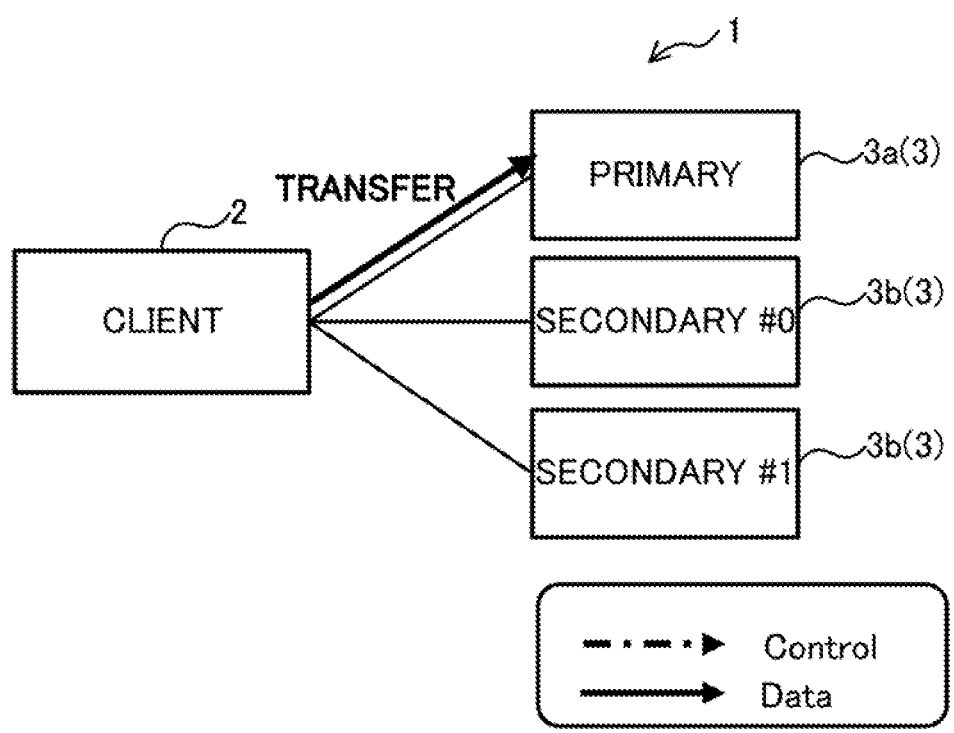
FIG. 7 is a diagram depicting an exemplary operation of the write access in a distributed storage system according to one embodiment.

Next, as illustrated in FIG. 7, the primary 3*a* issues an RDMA Read command based on the information indicative of the storing location contained in the write command to thereby execute an RDMA Read process, and completes a transfer of the write data from the client 2 to the primary 3*a*.

Figure 8:
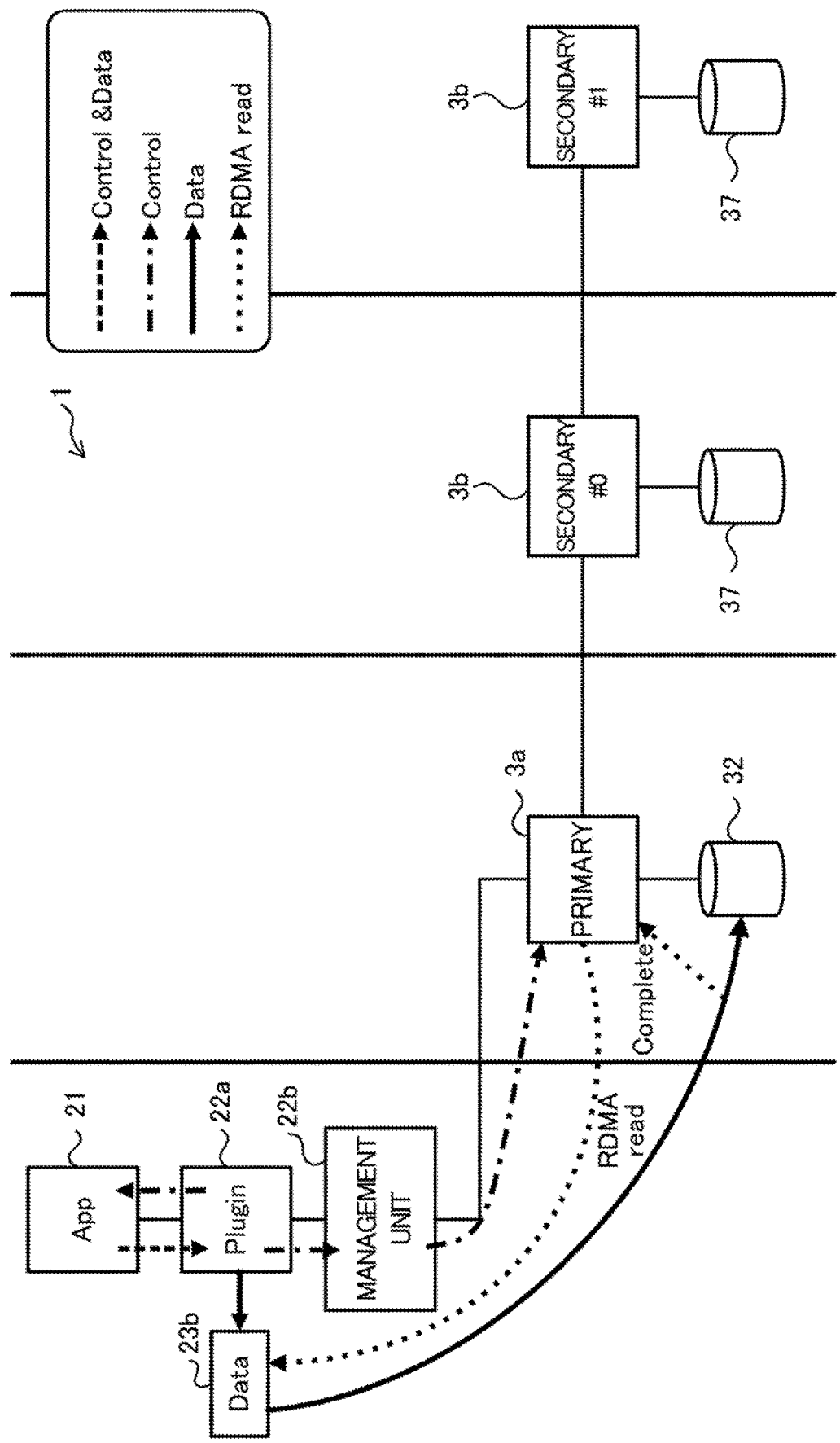
FIG. 8 is a diagram more specifically depicting the exemplary operation of the process illustrated in FIGS. 6 and 7.

FIG. 8 is a diagram depicting the exemplary operation of the processing more specifically illustrated in FIGS. 6 and 7. Note that, in FIG. 8, a plugin 22*a* and a management unit 22*b* are at least a part of the functions of the control unit 22. The plugin 22*a* is software that supports the App 21 to use the distributed storage system 1, and the management unit 22*b* is a function that makes the storage apparatus 3 open to the plugin 22*a*.

The App 21 issues a write command and write data (see the dashed line arrow, and Process P1 in FIG. 15). The plugin 22*a* stores the write data issued from the App 21 into the storage area (hereinafter also referred to as "targeted area") 23*b* (labeled as "Data" in FIG. 8) in the buffer 23 (see the solid line arrow).

The plugin 22*a* adds information indicative of the targeted area 23*b* to the write command as the location of the data, and sends the write command to the primary 3*a* via the management unit 22*b* and communication unit 24 (not illustrated) (see the dashed-dotted line arrows, and Processes P2 and P3 in FIG. 15).

In response to receiving the write command via the communication unit 31 as illustrated in FIG. 5, the primary 3*a* issues an RDMA Read command based on the write command and stores it into the queue 34, by the control unit 33. The RDMA Read command is a command instructing a copy of a content in a remote memory to a local memory.

In the examples of FIGS. 5 and 8, the RDMA Read command is a command instructing to read (pull) the write data from the storage area 23*a* (targeted area 23*b*) in the buffer 23 in the client 2 specified in the write command, and write the data in the storage area 32*a* (targeted area 32*b*) in the device 32 in the primary 3*a*.

For example, the control unit 33 obtains the information indicative of the storing location of the write data from the write command, and generates an RDMA Read command specifying the targeted area 23*b* specified by the information as a read source, and a targeted area 32*b* that is an unused area in the storage area 32*a* in the device 32 as a read destination.

As illustrated in FIGS. 5 and 8, the communication unit 31 dequeues the RDMA Read command that has been enqueued into the queue 34, and executes an RDMA Read process according to the RDMA Read command (see the dotted line arrow in FIG. 8, and Process P4 in FIG. 15). When the RDMA Read process completes after the write data is read from the targeted area 23*b* and written to the targeted area 32*b* (see the solid line arrow in FIG. 8, and Process P5 in FIG. 15), the communication unit 31 sends a completion notification to the control unit 33 (see the dotted line arrow in FIG. 8). In response, the control unit 33 detects the completion of the data transfer (RDMA Read).

As described above, the communication unit 31 is an example of a first transfer unit configured to execute a transfer process to read the write data from the storing location thereof in the buffer 23 based on the information indicative of the storing location of the write data in the storage area 23*a*, and write the write data to the device 32 in the primary 3*a*.

Through the above-mentioned processes, the write access from the client 2 to the primary 3*a* (see Processes P1 to P5 in FIG. 15) completes.

Figure 9:
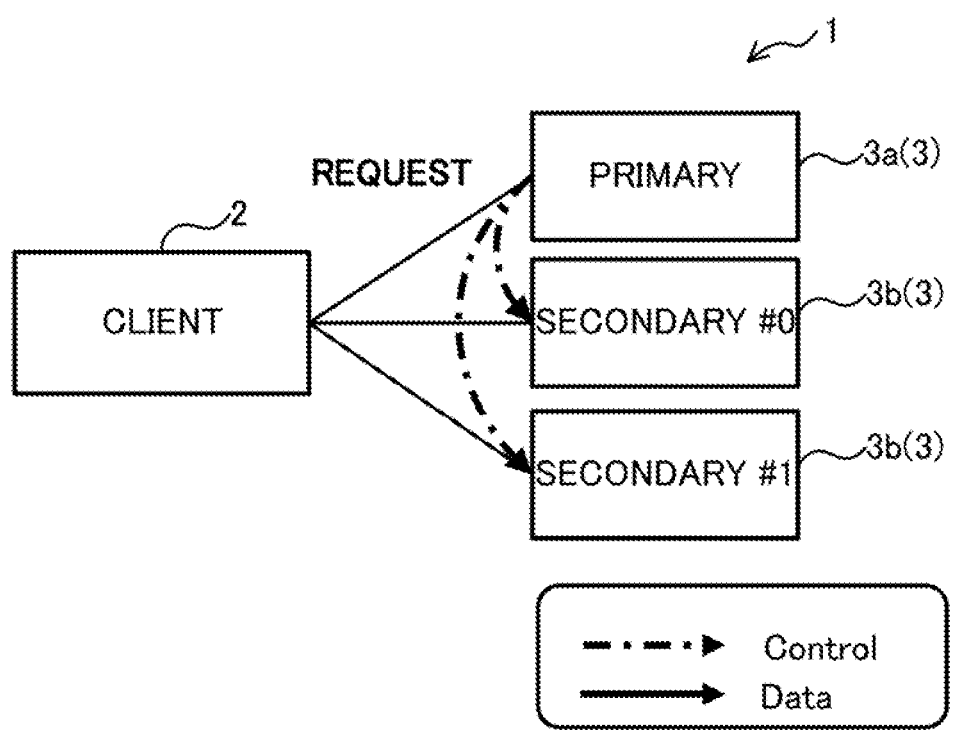
FIG. 9 is a diagram depicting an exemplary operation of a write access in a distributed storage system according to one embodiment.

As illustrated in FIG. 9, in response to receiving the completion notification of the RDMA Read process from the communication unit 31 (upon detection of the completion), the control unit 33 carries out a replication. For example, during the replication, the control unit 33 initializes the completion notification area 35, and sends a write command to the two secondaries #0 and #1 via the communication unit 31.

Note that the control unit 33 stores the deployment information (not illustrated) indicative of which replicas of data stored in the local device 32 are to be stored in which secondaries 3*b*, as described above. Thus, the control unit 33 may identify the particular secondary 3*b* to which the write command is to be sent based on the deployment information.

There may be write commands (transfer commands) in multiple types (e.g., two types). The control unit 33 sends write commands to the two secondaries 3*b*, in which the write commands are different in types as follows, for example. There may be more types of transfer commands depending on the number of secondaries 3*b* storing replicas of data to be written.

A first write command (second transfer request) is a command instructing a read of write data (source data) from the client 2, and may be similar to write commands received by the primary 3*a* from the client 2. For example, the control unit 33 may transfer the write command received from the client 2 as the first write command.

A second write command (third transfer request) is a command instructing a read of the write data from the primary 3a, and may include information indicative of the storing location of the write data in the storage area 32a in the device 32 in the primary 3a. Similarly to the client 2, examples of the information indicative of the storing location include an address or a pointer that specifies the start position of a storage area 32b of write data in the storage area 32a, for example. The information indicative of the storing location may also include the data size of the write data. For example, the control unit 33 may generate a second write command by modifying the information indicative of the storing location in the write command received from the client 2.

As described above, the first write command can be regarded as a write command specifying, as the read source, the client 2 or a storage apparatus 3, from which the local storage apparatus 3 has read the write data as the read source. The second write command can be regarded as a write command specifying the local storage apparatus 3 as the read source.

Figure 10:
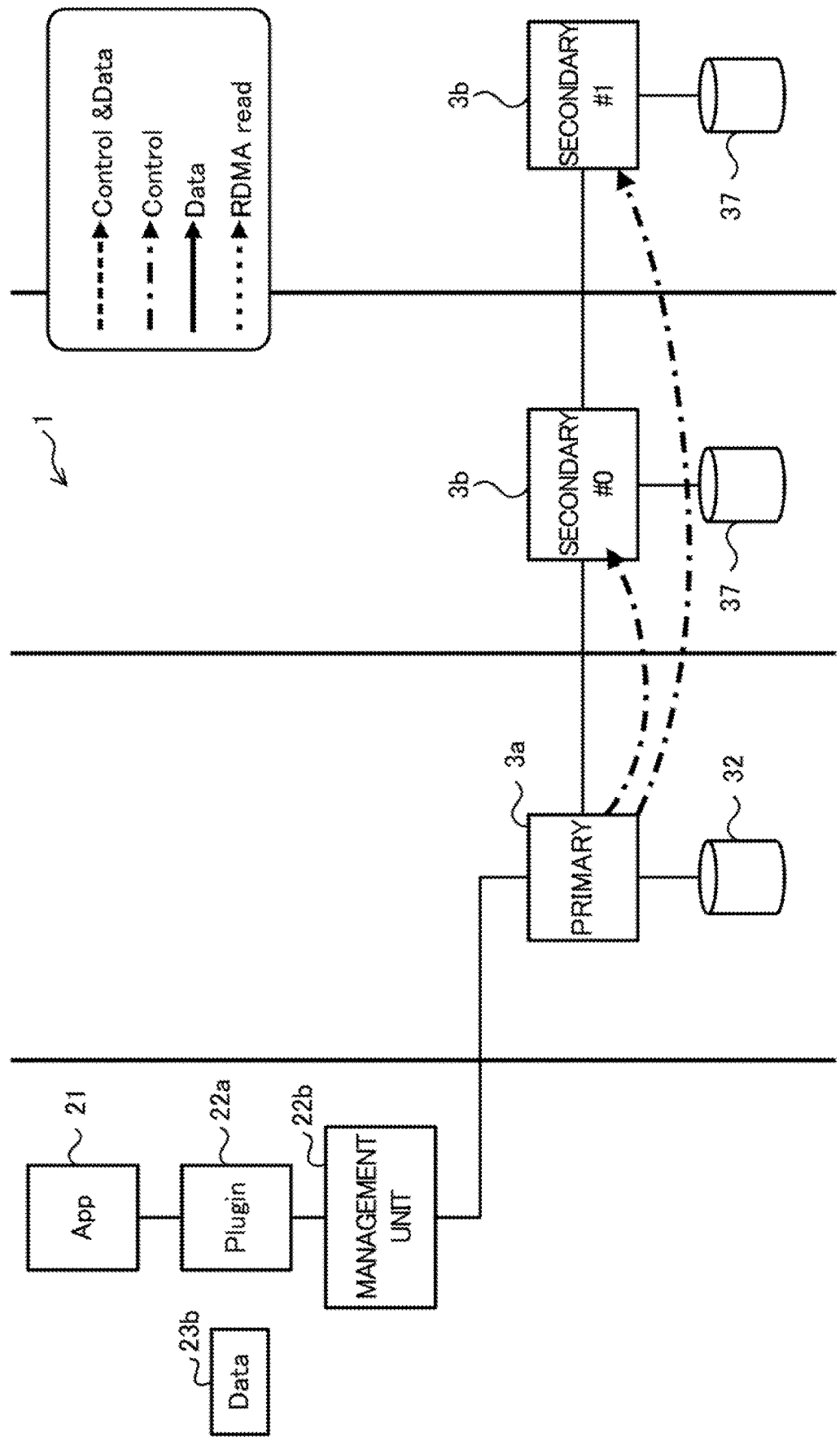
FIG. 10 is a diagram more specifically depicting the exemplary operation of the process illustrated in FIG. 9.

In the examples of FIGS. 9 and 10, the primary 3a sends the first write command (request) to the secondary #0 (Process P6 in FIG. 15), and sends the second write command (request) to the secondary #1 (Process P10 in FIG. 15).

As described above, the communication unit 31 and the control unit 33 are examples of a first sending unit. For example, the communication unit 31 and the control unit 33, which are examples of the first sending unit, send, to the secondary #0, a second transfer request instructing a transfer of the write data from the storage area 23a in the buffer 23 to the secondary #0. Further, the communication unit 31 and the control unit 33, which are examples of the first sending unit, send, to the secondary #1, a third transfer request instructing a transfer of the write data from the storing location of the write data in the storage area 32a to the secondary #1.

Figure 11:
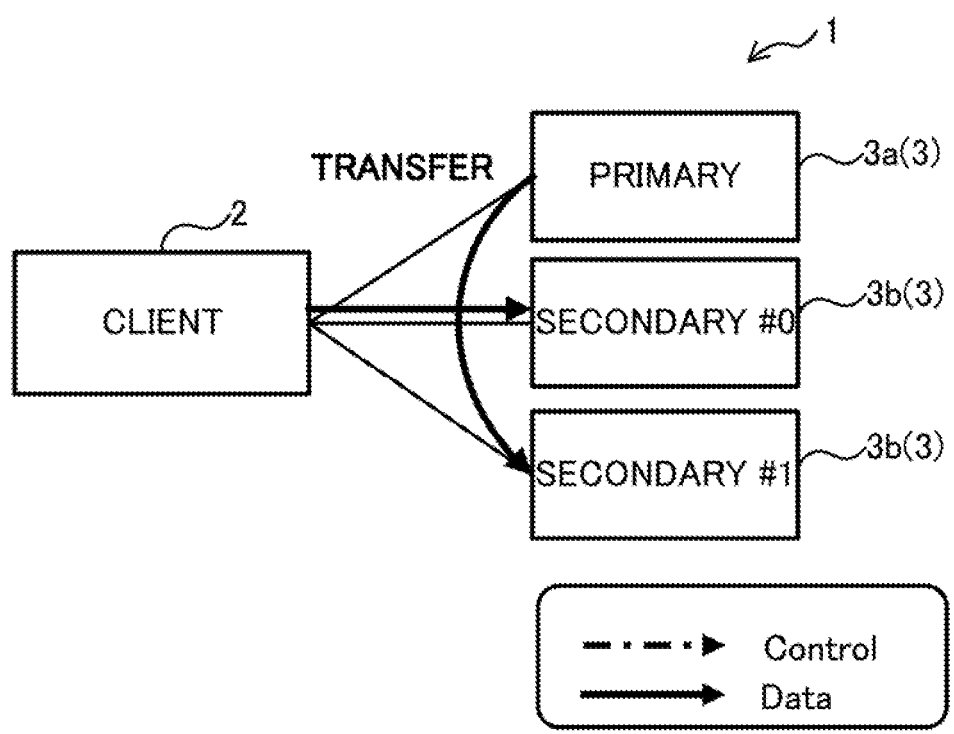
FIG. 11 is a diagram depicting an exemplary operation of a write access in a distributed storage system according to one embodiment.

As illustrated in FIG. 11, in response to receiving the respective write commands, the secondaries 3b each execute an RDMA Read process (labeled as "Transfer" in FIG. 11) based on the received write commands, and send a completion response to the primary 3a.

Figure 12:
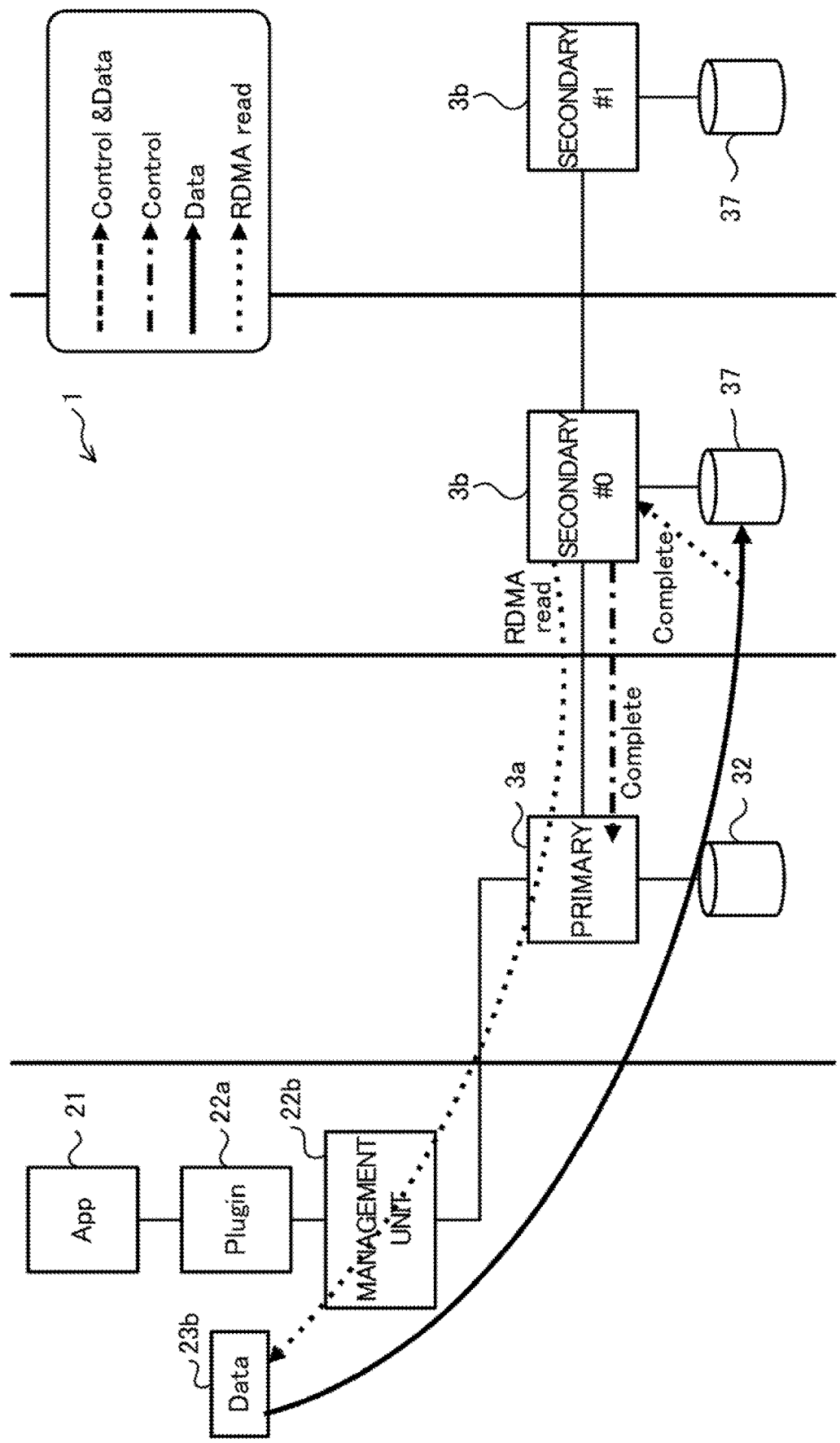
FIG. 12 is a diagram more specifically depicting the exemplary operation of the process illustrated in FIG. 11.

FIG. 12 is a diagram depicting an exemplary operation of an RDMA Read process by the secondary #0 according to the first write command, and FIG. 13 is a diagram depicting an exemplary operation of an RDMA Read process by the secondary #1 according to the second write command. The processes illustrated in FIGS. 12 and 13 may be carried out in parallel in time-wise.

As illustrated in FIGS. 5 and 12, the secondary #0 that has received the first write command issues an RDMA Read command based on the information indicative of the storing location contained in the first write command, and enqueues it into the queue 39 in the secondary #0.

The operation of the secondary #0 in response to the issued RDMA Read command is the same as the operation of the primary 3a except that the read destinations are different. For example, the control unit 38 obtains the information indicative of the storing location of the write data from the first write command, and generates an RDMA Read command specifying the targeted area 23b specified by the information as a read source, and a targeted area 37b that is an unused area in the storage area 37a in the device 37 as a read destination.

The communication unit 36 dequeues the RDMA Read command that has been enqueued into the queue 39, and executes an RDMA Read process according to the RDMA Read command (see the dotted line arrow in FIG. 12, and Process P7 in FIG. 15). When the RDMA Read process completes after the write data is read from the targeted area 23b and written to the targeted area 37b (see the solid line arrow in FIG. 12, and Process P8 in FIG. 15), the communication unit 36 sends a completion notification to the control unit 38 (see the dotted line arrow in FIG. 12). In response, the control unit 38 detects the completion of the data transfer (RDMA Read).

In response to detecting the completion of the data transfer, the control unit 38 notifies the completion notification area 35 in the primary 3a of the completion of the process associated with the first write command via the communication unit 36 (Process P9 in FIG. 15).

As described above, the communication unit 36 in the secondary #0 is an example of a second transfer unit configured to execute a transfer process to read the write data from the buffer 23 based on the information indicative of the storage area 23a included in the first write command, and write the write data to the device 37 in the secondary 40.

Further, the communication unit 36 in the secondary #1 is an example of a third transfer unit configured to execute a transfer process to read the write data from the device 32 based on the information indicative of the storage area 32a included in the second write command, and write the write data to the device 37 in the secondary #1.

Through the above-mentioned processes, the write access from the primary 3a to the secondary #0 (see "Replication": Processes P6 to P9 in FIG. 15) completes.

Further, as illustrated in FIGS. 5 and 13, in response to receiving the second write command, the secondary #1 issues an RDMA Read command based on the information indicative of the storing location contained in the second write command, and enqueues it into the queue 39 in the secondary #1.

The operation of the secondary #1 in response to the issued RDMA Read command is similar to the operation of the primary 3a or the secondary #0, except that the read sources and the read destinations are different. For example, the control unit 38 obtains the information indicative of the storing location of the write data from the second write command, and generates an RDMA Read command specifying the targeted area 32b specified by the information as a read source, and a targeted area 37b that is an unused area in the storage area 37a in the device 37 as a read destination.

The communication unit 36 dequeues the RDMA Read command that has been enqueued into the queue 39, and executes an RDMA Read process according to the RDMA Read command (see the dotted line arrow in FIG. 13, and Process P11 in FIG. 15). When the RDMA Read process completes after the write data is read from the targeted area 32b and written to the targeted area 37b (see the solid line arrow in FIG. 13, and Process P12 in FIG. 15), the communication unit 36 sends a completion notification to the control unit 38 (see the dotted line arrow in FIG. 13). In response, the control unit 38 detects the completion of the data transfer (RDMA Read).

In response to detecting the completion of the data transfer, the control unit 38 notifies the completion notification area 35 in the primary 3a of the completion of the process associated with the second write command via the communication unit 36 (Process P13 in FIG. 15).

Through the above-mentioned processes, the write access from the primary 3a to the secondary #1 (see "Replication": Processes P10 to P13 in FIG. 15) completes.

As illustrated in FIGS. 5 and 14, in response to detecting that completion notifications have been made to the completion notification area 35 from all of the secondaries 3b, the primary 3a sends a completion response of the write command to the client 2 (the App 21) (see the dashed-dotted line arrows in FIG. 14, and Processes P14 to P16 in FIG. 15).

As described above, according to the distributed storage system 1 of one embodiment, the primary 3a receives a command including the storing location of write data, instead of receiving the write data per se. Upon writing the write data to the device 32 or 37, the primary 3a issues a command instructing a read of (issues an RDMA Read command instructing to pull) the source data. At this time, the primary 3a arbitrates the read location of the original data and the read timing between the primary 3a and the plurality of secondaries 3b so that RDMA Read processes do not conflict, utilizing the knowledge possessed by the primary 3a about where write data is deployed (the knowledge about the owner of the write data).

In the manner described above, in the distributed storage system 1, because transfers are carried out taking the network bandwidth into consideration, a congestion (collision) of communications as illustrated in FIG. 4, for example, can be avoided. Further, by utilizing a high-performances (high-speeds) of the storage apparatuses such as those employing NVMe, data transfers can be achieved while read processes are being distributed.

Accordingly, a reduction in the access latencies in the client 2 and the storage apparatuses 3 and an improvement in the access throughput can be achieved.

FIG. 16 is a diagram illustrating an example of a time chart of a data transfer process according to one embodiment. FIG. 16 illustrates a comparison between the technique exemplified in FIGS. 2 to 4 (for convenience, labeled as "COMPARATIVE EXAMPLE") and the technique according to one embodiment exemplified in FIGS. 6 to 15 (labeled as "ONE EMBODIMENT"). In FIG. 16, it is assumed that the vertical axis indicates time, and each of time intervals of timing t0 to t1, t1 to t2, and t2 to t3 are equally time intervals t. It is also assumed that a data transfer to one destination is carried out during one time interval, i.e., one time interval t.

As exemplified in FIG. 16, in the comparative example depicted on the left side of the dashed-dotted line, the client 210 transfers data to each of the primary 110-1 and the secondaries #0 and #1. Thus, the client 210 experiences communication loads that is three times higher than the load of a data transfer to a single destination, and the data transfer takes three-hold longer time. In the example of FIG. 16, a data transfer is carried out in the time interval 3t from the timing t0 indicated by the symbol A to the timing t3.

In contrast, in the technique according to one embodiment depicted on the right side of the dashed-dotted line, a data transfer (RDMA Read process) is first carried out from the client 2 to the primary 3a (between the timing t0 and t1), as indicated by the symbol B. Thereafter, a data transfer from the client 2 to the secondary #0 (see the symbol C) and a data transfer from the primary 3a to the secondary #1 (see the symbol D) are carried out in parallel by means of RDMA Reads (between the timing t1 and t2).

As described above, in the technique according to one embodiment, unlike the comparative example, the communication loads do not concentrate on the client 2 or the primary 3a, and two data transfers by the different operation subjects are carried out in parallel at the timing t1. Thus, in the technique according to one embodiment, the data transfers can complete at the timing t2 so that the time interval (from t2 to t3) is shortened by 1t, as compared with the comparative example. In other words, the data transfers can complete at earlier timing.

As described above, according to the technique of one embodiment, the efficiency of data accesses can be improved in the distributed storage system 1 in which data is stored in the plurality of storage apparatuses 3 in a distributed manner.

(1-3-2) Exemplary Operation of Completion Notification Process to Completion Notification Area Next, an exemplary operation of a completion notification process by the secondary 3b to the completion notification area 35 in the primary 3a will be described. The completion notification area 35 is an example of a given area.

As described above, during a replication, the primary 3a initializes the completion notification area 35, and sends a write command to the two secondaries 3b. After the respective RDMA Read processes (transfer processes) complete, the two secondaries 3b each execute the completion notification process for notifying the completion notification area 35 in the primary 3a of the completion of the process associated with the write command.

For example, the respective communication units 36 in the secondaries #0 and #1 are examples of a completion notification unit configured to set information indicative of the completion of an RDMA Read process to the completion notification area 35 in the primary 3a.

The primary 3a is an example of a response unit configured to send a response indicating completion of the process associated with the write command to the client 2 in response to detecting the completion of RDMA Read processes in all of the secondaries 3b to which the write data is to be written, based on the information set in the completion notification area 35.

In one embodiment, the completion notification process may be carried out, for example, in one of the following procedures (a) and (b):

(a) First Example of Completion Notification Process

Figure 17:
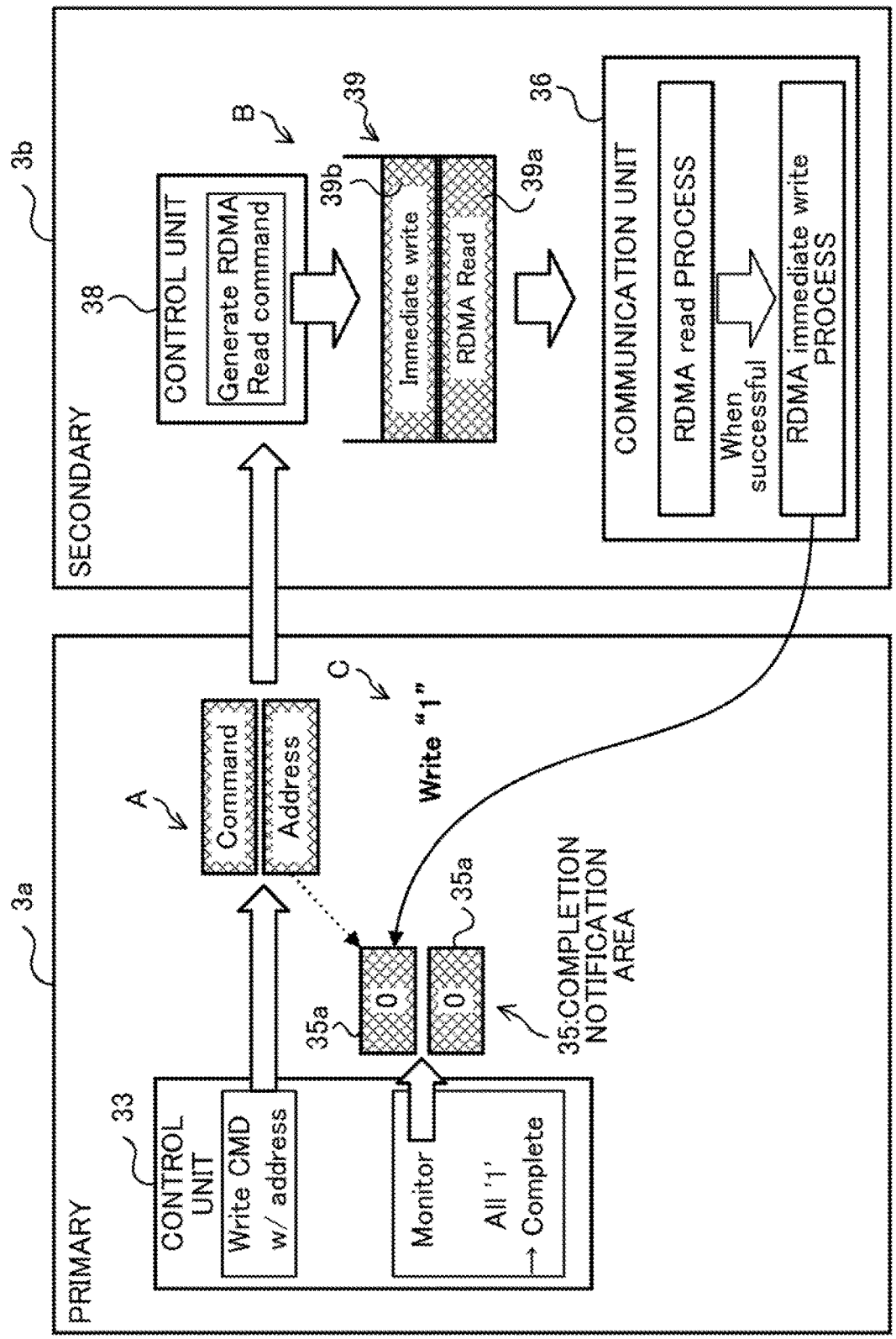
FIG. 17 is a diagram depicting a first example of a completion notification process.

FIG. 17 is a diagram depicting a first example of the completion notification process. As illustrated in FIG. 17, the control unit 33 in the primary 3a may provide areas 35a for completion detection in the completion notification area 35 in number corresponding to the number of secondaries 3b, and may initialize the value in each area 35a to zero (0).

As indicated by the arrow A, upon sending a first or second write command to the secondaries 3b, the control unit 33 may send address information (e.g., an address or a pointer) of an area 35a reserved for that secondary 3b, together with a write command, for example.

As indicated by the arrow B, the control unit 38 in the secondary 3b may generate an RDMA Read command based on the received write command, and enqueue (place) the command and then the RDMA Write command for a write to the completion notification area 35, into the queue 39. An example of the RDMA Write command for a write to the completion notification area 35 is an RDMA Write command with an immediate value (RDMA Immediate Write). For example, the control unit 38 may generate an RDMA Write command specifying the area 35a in the completion notification area 35 in the primary 3a as the write destination that is specified by the address information received together with the write command.

Because the queue 39 is configured as an FIFO queue, commands enqueued into the queue 39 are processed on the first-in first-out basis. Also, in the secondary 3b, if processing of a command fails, the queue 39 transitions to an error state instead of transitioning to the subsequent step, except for some exceptions.

Thus, after an RDMA Read process according to the RDMA Read command 39a that has been first enqueued into the queue 39 completes successfully, the communication unit 36 in the secondary 3b executes a write process according to the RDMA Write command 39b enqueued later into the queue 39.

For example, as indicated by the arrow C, the communication unit 36 may write (set), as a completion notification, a value of one (1) to the area 35a in the completion notification area 35 based on the RDMA Write command 39b.

All of the secondaries 3b carry out such processing on the respective areas 35a allocated to the secondaries 3b.

This enables the control unit 33 in the primary 3a to detect completion of RDMA Read processes in all of the secondaries 3b by monitoring whether or not a value of one (1) is set to all of the areas 35a in the completion notification area 35.

Accordingly, it is possible to reduce communications among the primary 3a and the secondaries 3b for completion notifications of RDMA Read processes by the secondaries 3b and the completion process by the primary 3a, thereby reducing the network loads induced by data transfers.

In addition, because the processing loads of the primary 3a and the secondaries 3b can also be reduced, processing can be carried out in the client 2 and the primary 3a with reduced control overheads. In other words, the latencies of write accesses in the distributed storage system 1 can be reduced.

(b) Second Example of Completion Notification Process

Figure 18:
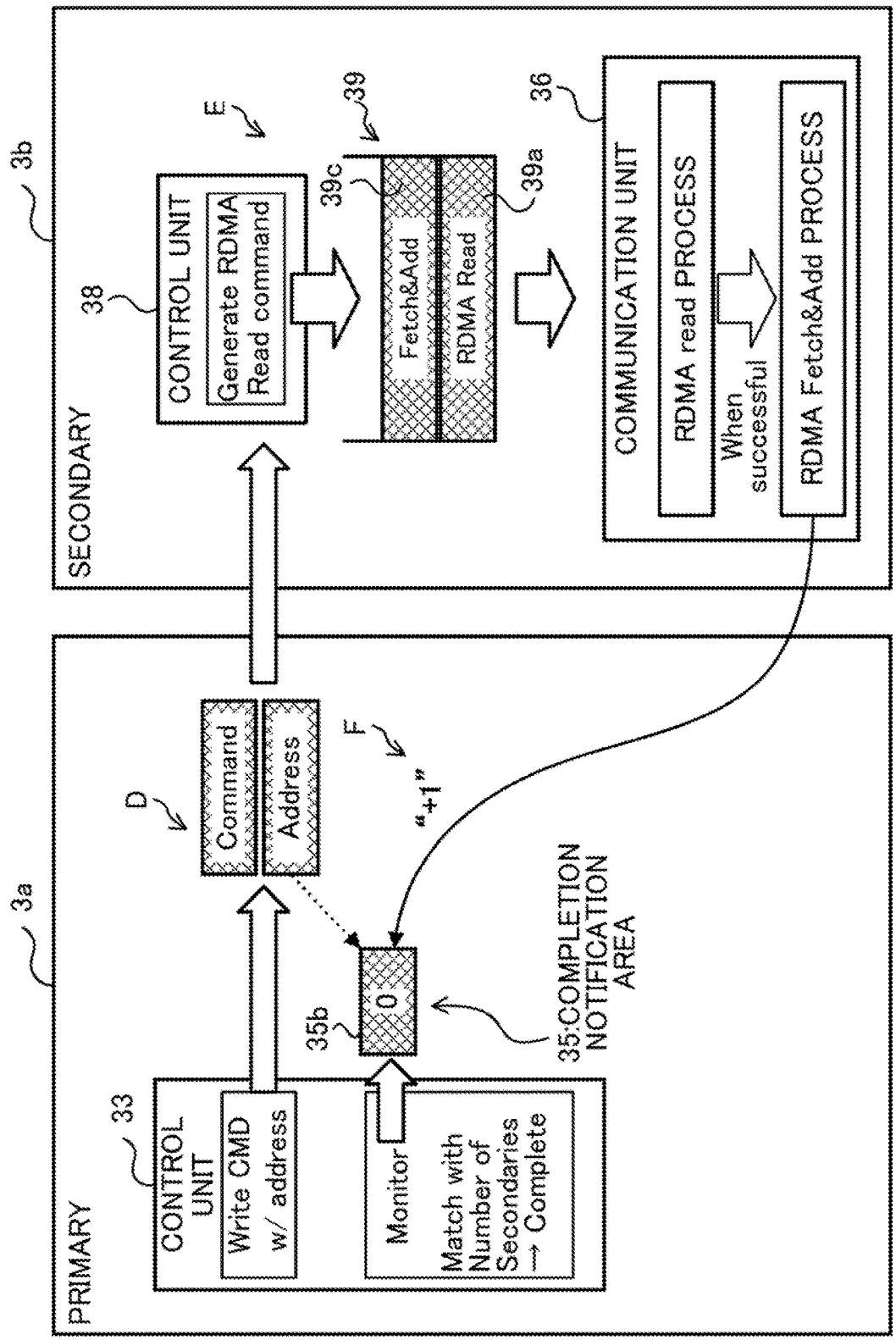
FIG. 18 is a diagram depicting a second example of a completion notification process.

FIG. 18 is a diagram depicting a second example of the completion notification process. As illustrated in FIG. 18, the control unit 33 in the primary 3a may provide a single area 35b for completion detection in the completion notification area 35, and may initialize the value in the area 35b to zero (0).

As indicated by the arrow D, upon sending a first or second write command to the secondaries 3b, the control unit 33 may send address information (e.g., an address or a pointer) of the common area 35b to each secondary 3b, together with the write command, for example.

As indicated by the arrow E, the control unit 38 in the secondary 3b may enqueue (place) an RDMA Read command and then an RDMA command for updating the value in the completion notification area 35, into the queue 39. An example of the RDMA command for updating the value in the completion notification area 35 is an RDMA Fetch and Add command of Atomic operations. For example, the control unit 38 may generate an RDMA command specifying the area 35b in the completion notification area 35 in the primary 3a as the update destination which is specified by the address information received together with the write command.

When the RDMA Read process completes successfully, the communication unit 36 in the secondary 3b executes an update process according to the RDMA command 39c enqueued later into the queue 39. For example, as indicated by the arrow F, the communication unit 36 may read the value from the area 35b in the completion notification area 35 according to the RDMA command 39c, add one (1) to the value, and write (set) the value obtained by the addition into the area 35b as a completion notification.

All of the secondaries 3b carry out the above-mentioned processing on the common area 35b.

This enables the control unit 33 in the primary 3a to detect completion of RDMA Read processes in all of the secondaries 3b by monitoring whether or not the value in the area 35b in the completion notification area 35 matches the number of secondaries 3b.

Although it has been described that the communication unit 36 adds one (1) to the value in the area 35b, this is not limiting. For example, the control unit 33 in the primary 3a may set the number of secondaries 3b as the initial value to the area 35b. In this case, the communication unit 36 may subtract one (1) from the value in the area 35b by a command other than the RDMA Fetch and Add command, and the control unit 33 may detect completion of RDMA Read processes in all of the secondaries 3b if the value in the area 35b becomes zero (0).

As described above, the communication unit 36 may increase or decrease the value set in the area 35b, and the control unit 33 may detect completion of RDMA Read processes in all of the secondaries 3b if the increased or decreased amount of the value set in the area 35b matches the number of secondaries 3b.

The same effects as in the first example are also achieved by the above-mentioned processing. Further, because the plurality of secondaries 3b use the shared area 35b, the processing loads by the primary 3a, such as loads for sending address information and monitoring the area 35b, can be reduced.

(1-3-3) Exemplary Operation of Read Access

Figure 19:
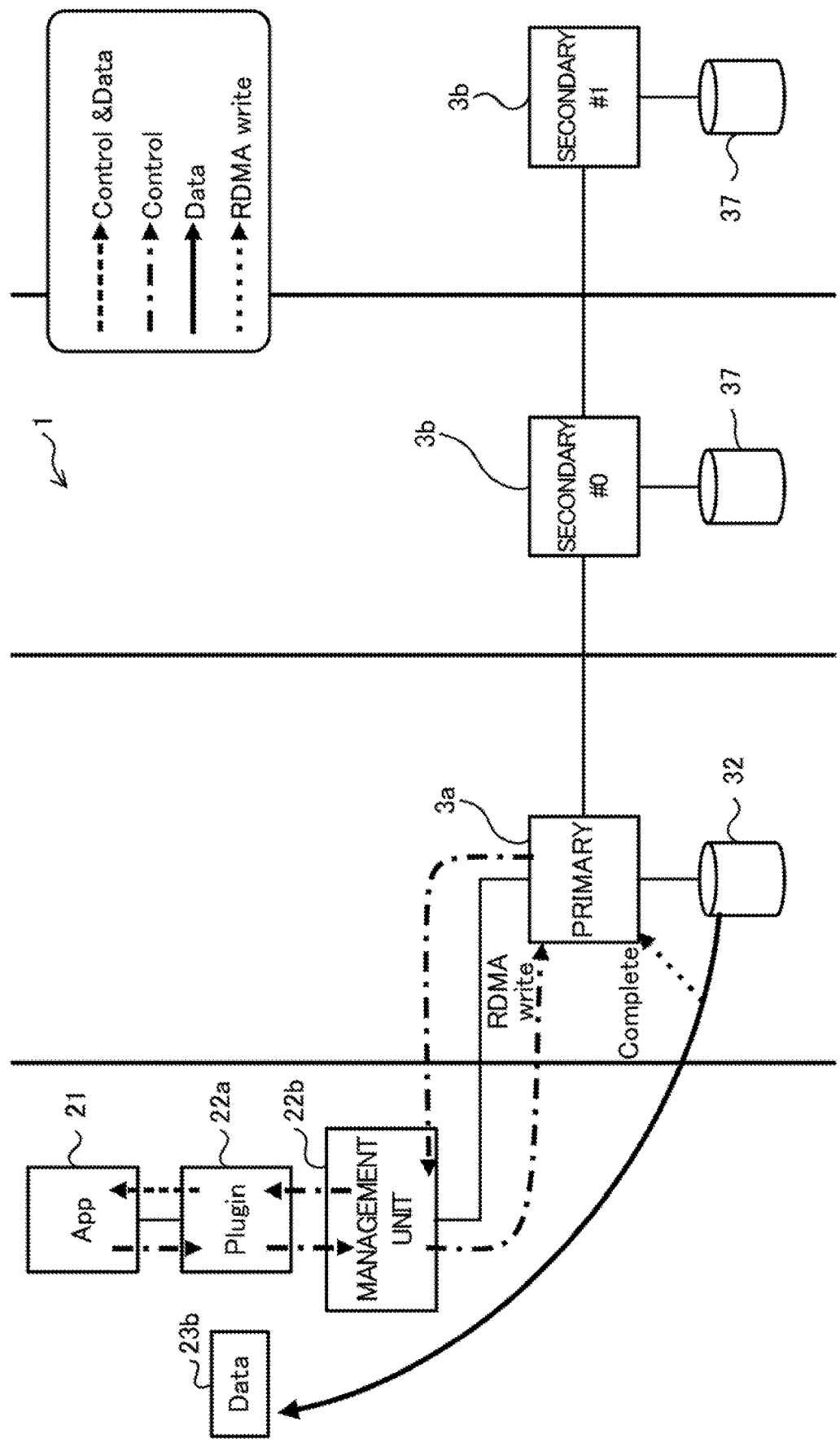
FIG. 19 is a diagram depicting an exemplary operation of a read access in a distributed storage system according to one embodiment.

FIG. 19 is a diagram depicting an exemplary operation of a read access in the distributed storage system 1 according to one embodiment.

As illustrated in FIG. 19, the App 21 issues a read command (see dashed-dotted line arrow). The plugin 22a adds, to the read command, information indicative of a targeted area 23b to store a result (read data) of a process according to the read command, in the storage area 23a in the buffer 23, as the location of the data.

Examples of the information indicative of the targeted area 23b include an address or a pointer that specifies the start position of the targeted area 23b of the read data in the storage area 23a, for example. Further, the information indicative of the targeted area 23b may include the data size of the read data.

The plugin 22a adds the information indicative of the targeted area 23b to the read command as the location of the data, and sends the read command to the primary 3a via the management unit 22b and communication unit 24 (not illustrated) (see dashed-dotted line arrows).

As illustrated in FIG. 5, in response to receiving the read command via the communication unit 31, the primary 3a issues an RDMA Write command based on the read command and stores it into the queue 34. The RDMA Write command is a command instructing a copy of a content in a local memory to a remote memory.

In the examples of FIGS. 5 and 19, the RDMA Write command is a command instructing to read the read data (original) specified in the read command from the storage area 32a (targeted area 32b) in the device 32, and to write (push) it into the storage area 23a (targeted area 23b) in the client 2 specified in the read command.

The control unit 33 obtains information indicative of the storing location of the read data from the read command, and generates an RDMA Write command specifying the targeted area 32b in the device 32 in which the read data is stored, specified in the read command, as the write source, and the targeted area 23b specified in the obtained information as a write destination, for example.

As illustrated in FIGS. 5 and 19, the communication unit 31 dequeues the RDMA Write command that has been enqueued into the queue 34, and executes an RDMA Write process according to the RDMA Write command. When the RDMA Write process completes after the read data is read from the targeted area 32b and written to the targeted area 23b (see the solid line arrow in FIG. 19), the communication unit 31 sends a completion notification to the control unit 33 (see the dotted line arrow in FIG. 19). In response, the control unit 33 detects the completion of the data transfer (RDMA Write).

Through the above-mentioned processes, the read access from the client 2 to the primary 3a completes.

As illustrated in FIGS. 5 and 19, in response to receiving the completion notification of the RDMA Write process from the communication unit 31 (in response to detecting the completion), the control unit 33 sends a completion response of the process according to the read command to the client 2 via the communication unit 31 (see dashed-dotted line arrows in FIG. 19).

As described above, in the distributed storage system 1 according to one embodiment, read accesses can also be achieved by using RDMA processes.

(1-4) Modification to One Embodiment

Figure 20:
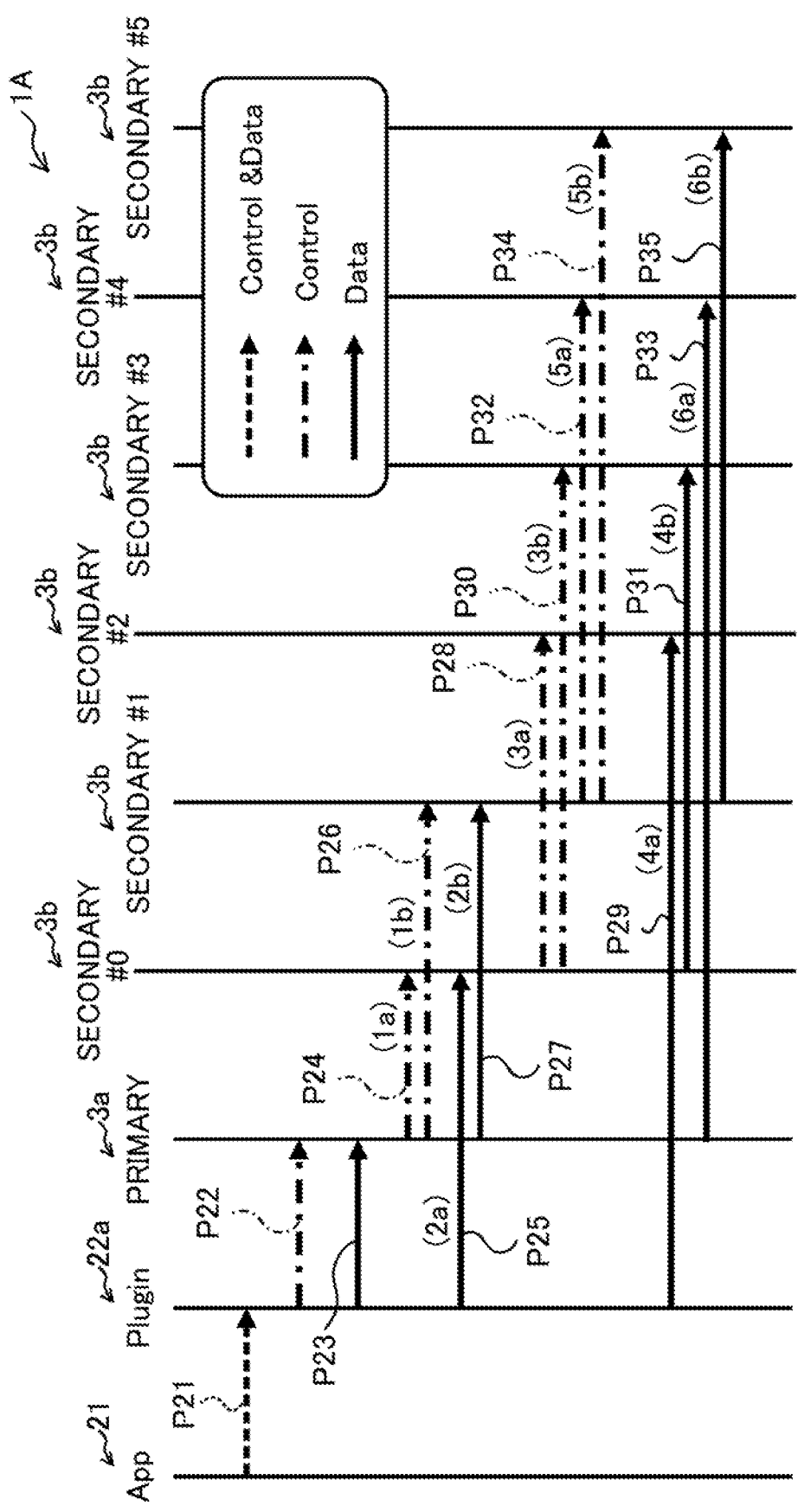
FIG. 20 is a sequence diagram depicting an exemplary operation of a write access in a distributed storage system according to a modification.

Next, a modification to one embodiment will be described. The modification will be described with reference to the case in which multi-level data transfers are carried out. FIG. 20 is a sequence diagram depicting an exemplary operation of a write access in a distributed storage system 1A according to the modification.

As illustrated in FIG. 20, the distributed storage system 1A according to a modification includes seven storage apparatuses 3 including one primary 3a and six secondaries 3b. In FIG. 20, as compared with the sequence illustrated in FIG. 15, a management unit 22b, which is one of the operation subjects, is omitted.

In FIG. 20, the secondaries #2 to #5 are examples of fourth to seventh storage apparatuses, respectively. The respective devices 37 provided in the secondaries #2 to #5 are examples of fourth to seventh storage areas, respectively. Further, respective write commands sent to the secondaries #2 to #5 are examples of fourth to seventh transfer requests, respectively.

In the distributed storage system 1A according to the modification, the primary 3a and secondaries 3b may carry out a hierarchical data transfer processes by a control unit 33 and a control unit 38 as follows.

As illustrated in FIG. 20, a write access from a client 2 to the primary 3a by an App 21, a plugin 22a and the primary 3a (Processes P21 to P23) is similar to one in one embodiment. After Processes P21 to P23 complete, the distributed storage system 1A may execute processes of the following (1) to (6);

(1) When a data transfer (RDMA Read process) of the write data to the device 32 in the primary 3a completes, during a replication, the primary 3a may send first and second write commands as follows to the secondaries #0 and #1, respectively.

(1a) The primary 3a sends a first write command to the secondary #0 including the following parameters (Process P24).

Source=Plugin, Next_Storage={#2, #3}

The parameter Source specifies the read source of the RDMA Read process, and is an example of information indicative of a storing location of the write data in one embodiment.

The parameter Next_Storage is information specified by the secondary 3b receiving the write command, as the transmission destination of a write command to be sent by that secondary 3b after the secondary 3b completes to execute the RDMA Read process. To the transmission destination, information identifying a secondary 3b at a level lower than (subsequent to) this secondary 3b may be set, and the address of communication unit 36 may be set as an example.

The first write command sent in the above (1a) is a command instructing the secondary #0 to execute an RDMA Read process from the client 2, as well as instructing the secondary #0 to send a write command to the secondaries #2 and #3 after this RDMA Read process completes.

(1b) The primary 3a sends a second write command to the secondary #1 including the following parameters (Process P26).

Source=Primary, Next_Storage={#4, #5}

The second write command sent in the above (1b) is a command instructing the secondary #1 to execute an RDMA Read process from the primary 3a, as well as instructing the secondary #1 to send a write command to the secondaries #4 and #5 after this RDMA Read process completes.

(2) The secondaries #0 and #1, in response to receiving the first and second write commands, respectively, each execute a data transfer process as follows.

(2a) The secondary #0 executes an RDMA Read process from the targeted area 23b in the client 2 to the targeted area 37b in the secondary #0 (Process P25), in the same manner as in one embodiment.

(2b) The secondary #1 executes an RDMA Read process from the targeted area 32b in the primary 3a to the targeted area 37b in the secondary #1 (Process P27), in the same manner as in one embodiment.

Note that the above (1a) and (1b), and (2a) and (2b) may be carried out in parallel in time-wise.

Further, after completion of the RDMA Read processes, the secondaries #0 and #1 may send a completion notification to the completion notification area 35 in the primary 3a using the method exemplified in FIG. 17 or 18, in the same manner as in one embodiment.

(3) The secondary #0, which has completed the RDMA Read process according to the above (2a), sends the first and second write commands to the secondaries #2 and #3, respectively, specified in the Next_Storage parameter in the above (1a).

(3a) The secondary #0 sends a first write command including the following parameters to the secondary #2 (Process P28).

Source=Plugin, Next_Storage={ }

The parameter Next_Storage={ } indicates that the secondary 3b receiving the write command has no secondary 3b to send a write command, in other words, the secondary 3b receiving the write command is the lowest secondary 3b.

The first write command sent in the above (3a) is a command instructing the secondary #2 to execute an RDMA Read process from the client 2.

(3b) The secondary #0 sends a second write command including the following parameters to the secondary #3 (Process P30).

Source=#0, Next_Storage={ }

The second write command sent in the above (3b) is a command instructing the secondary #3 to execute an RDMA Read process from the secondary #0.

(4) The secondaries #2 and #3, in response to receiving the first and second write commands, respectively, each execute a data transfer process as follows.

(4a) The secondary #2 executes an RDMA Read process from the targeted area 23b in the client 2 to the targeted area 37b in the secondary #2 (Process P29), in the same manner as in one embodiment.

(4b) The secondary #3 executes an RDMA Read process from the targeted area 37b in the secondary #0 to the targeted area 37b in the secondary #3 (Process P31).

(5) The secondary #1, which has completed the RDMA Read process according to the above (2b), sends the first and second write commands to the secondaries #4 and #5, respectively, specified in the Next_Storage parameter in the above (1).

(5a) The secondary #1 sends a first write command including the following parameters to the secondary #4 (Process P32).

Source=Primary, Next_Storage={ }

The first write command sent in the above (5a) is a command instructing the secondary #4 to execute an RDMA Read process from the primary 3a.

(5b) The secondary #1 sends a second write command including the following parameters to the secondary #5 (Process P34).

Source=#1, Next_Storage={ }

The second write command sent in the above (5b) is a command instructing the secondary #5 to execute an RDMA Read process from the secondary #1.

(6) The secondaries #4 and #5, in response to receiving the first and second write commands, respectively, each execute a data transfer process as follows.

(6a) The secondary #4 executes an RDMA Read process from the targeted area 32b in the primary 3a to the targeted area 37b in the secondary #4 (Process P33), in the same manner as in one embodiment.

(6b) The secondary #5 executes an RDMA Read process from the targeted area 37b in the secondary #1 to the targeted area 37b in the secondary #5 (Process P35).

Note that the above (3a), (3b), (5a), and (5b) may be carried out in parallel in time-wise, and the above (4a), (4b), (6a), and (6b) may be carried out in parallel in time-wise.

Further, after completion of the RDMA Read processes, the secondaries #2 to #5 may send a completion notification to the completion notification area 35 in the primary 3a using the method exemplified in FIG. 17 or 18, in the same manner as in one embodiment.

In the meantime, as illustrated in FIGS. 4 and 16, as the number of secondaries storing replicas increases, overheads and processing delay of replications occurring in the client 210 would increase.

In contrast, according to the distributed storage system 1A of the modification, because a data transfer can be achieved in step-wise across multiple layers, a reduction in the access latencies in the client 2 and the storage apparatuses 3 and an improvement in the access throughput can be achieved.

(1-5) Exemplary Hardware Configuration of One Embodiment

In one embodiment and the modification thereto, the functions of a node as the client 2 or the storage apparatuses 3 may be embodied by one computer or by two or more computers as a HW resource. Further, at least some of the functions of the node may be embodied using a HW resource and a network (NW) resource provided in a cloud environment.

Figure 21:
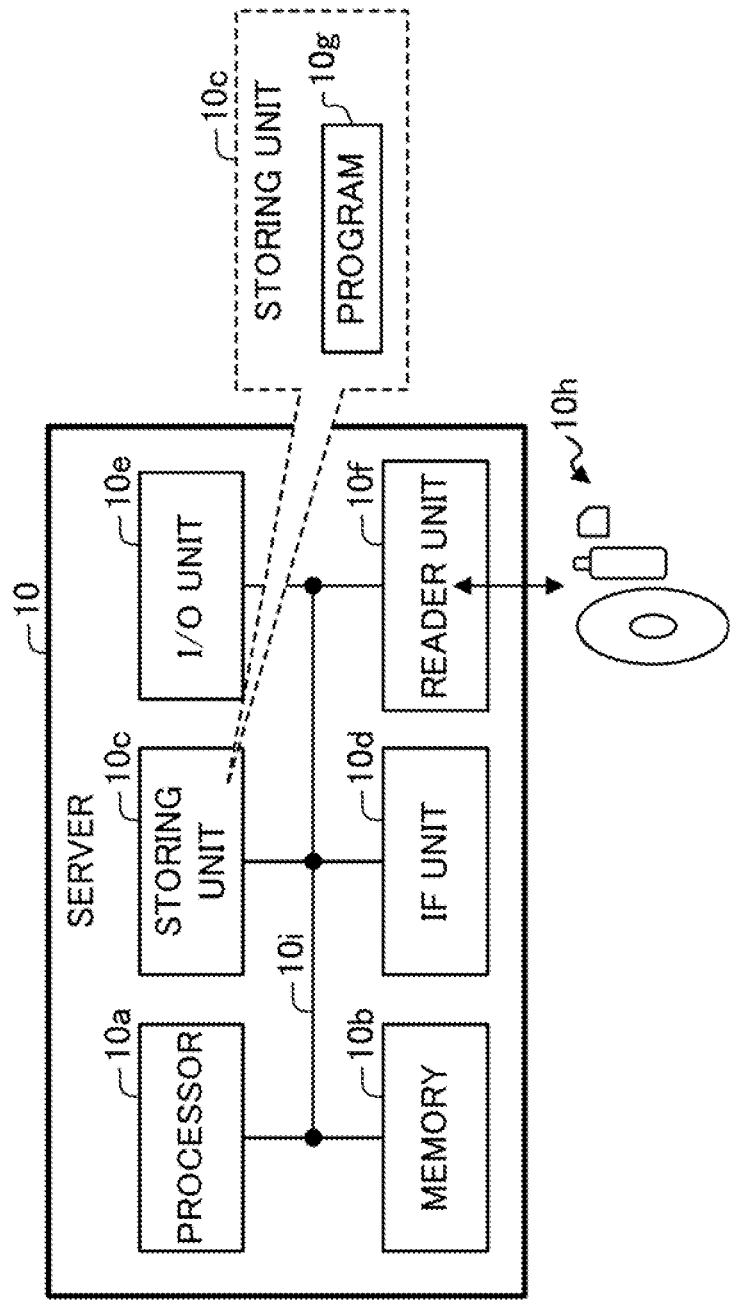
FIG. 21 is a block diagram illustrating a HW configuration of a server according to one embodiment.

FIG. 21 is a block diagram illustrating an exemplary HW configuration of a server 10 according to one embodiment. The server 10 is an example of an information processing apparatus. As the information processing apparatus, a wide variety of computers such as PCs, mainframes, and the like may be used in place of a server. When a plurality of computers are used as HW resources for embodying the functions of the server 10, each computer may have the HW configuration illustrated in FIG. 21.

The server 10 may include, as an example, a processor 10a, a memory 10b, a storing unit 10c, an IF unit 10d, an input/output (I/O) unit 10e, and a reader unit 10f as the HW configuration.

The processor 10a is one example of a processing unit configured to perform a wide variety of controls and computations. The processor 10a may be communicatively connected to each other to each block in the server 10 via a bus 10i. In one embodiment, the processor 10a may be a multiprocessor including a plurality of processors (e.g., multiple CPUs). Each of the plurality of processors may also be a multi-core processor having a plurality of processor cores.

As the processor 10a, an integrated circuit (IC), such as an MPU, a GPU, an APU, a DSP, an ASIC, and an FPGA, may be used in place of the CPU. MPU is an abbreviation for Micro Processing Unit. GPU is an abbreviation for Graphics Processing Unit, and APU is an abbreviation for Accelerated Processing Unit. DSP is an abbreviation for Digital Signal Processor, ASIC is an abbreviation for Application Specific IC, and FPGA is an abbreviation for Field-Programmable Gate Array.

The memory 10b is one example of HW configured to store information, such as a wide variety of data and programs. Examples of the memory 10b include volatile memories, such as DRAMs, as well as non-volatile memories such as PMs, for example.

The storing unit 10c is one example of HW configured to store information, such as a wide variety of data and programs. Examples of the storing unit 10c include a wide variety of storing apparatuses, such as solid state drive apparatuses, e.g., SSDs, magnetic disk apparatuses, e.g., HDDs, and non-volatile memories, for example. Non-volatile memories include flash memories, storage class memories (SCMs), and read only memories (ROMs), for example.

The buffer 23 in the client 2, the device 32 in the primary 3a, and the devices 37 in the secondaries 3b according to one embodiment may be each embodied by storage areas in at least one of the memory 10b and storing unit 10c. The queue 34 and the completion notification area 35 in the primary 3a and the queues 39 in the secondaries 3b may be each embodied by storage areas in the memory 10b.

In addition, the storing unit 10c may store a program 109 for embodying all or a part of the functions of the server 10. For example, the processor 10a in the client 2 can embody the functions as the client 2 illustrated in FIG. 5, by expanding the program 10g stored in the storing unit 10c into the memory 10b and executing the program 10g expanded on the memory 10b. Further, for example, the processor 10a in the primary 3a can embody the function as the primary 3a illustrated in FIG. 5 by expanding and executing the program 10g (storage controlling program) stored in storing unit 10c into the memory 10b. Further, for example, the processor 10a in each secondary 3b can embody the function as the secondary 3b illustrated in FIG. 5 by expanding and executing the program 10g stored in storing unit 10c in the memory 10b.

The IF unit 10d is one example of a communication IF configured to carry out processing, such as controls on connections to and communications with a network (not illustrated). For example, the IF unit 10d may include an adaptor compliant with a LAN, such as Infiniband® and Ethernet®, or a network adaptor compliant with a SAN (e.g., FC). For example, the program 10g may be downloaded from the network to the server 10 via that communication IF and stored in the storing unit 10c.

The I/O unit 10e may include either or both of input units, such as a mouse, a keyboard, and operation buttons; and output units, such as a monitor e.g., a touch panel display and a liquid crystal display (LCD), a projector, and a printer.

The reader unit 10f is one example of a reader configured to read information of data and programs recorded in a recording medium 10h. The reader unit 10f may include a connection terminal or device, to which the recording medium 10h is connected or inserted. Examples of the reader unit 10f include adaptors compliant with the Universal Serial Bus (USB) standard, drive apparatuses for accessing recording disks, and card readers for accessing flash memories, e.g., SD cards. Note that the program 10g may be stored in the recording medium 10h, and the reader unit 10f may read the program 10g from the recording medium 10h and may store the program 10g in the storing unit 10c.

Examples of the recording medium 10h may include non-transitory recording media, such as magnetic/optical disks and flash memories, for example. Examples of magnetic/optical disks may include flexible disks, compact discs (CDs), digital versatile discs (DVDs), Blu-ray Discs, and holographic versatile discs (HVDs), for example. Examples of flash memories may include USB memories and SD cards, for example.

The HW configuration of the server 10 described above is merely exemplary. Accordingly, in the server 10, HW may be added or omitted (e.g., any blocks may be added or omitted), divided, or combined in any combinations, or a bus may be added or omitted, where it is deemed appropriate.

(2) Miscellaneous

The above-describe technique in accordance with one embodiment and a modification thereto may be practiced in the following modifications or variations.

For example, in the client 2 illustrated in FIG. 5, the functions of the control unit 22 and communication unit 24 may be combined in any combinations, or may be separate. Further, in the primary 3a illustrated in FIG. 5, the functions of communication unit 31 and the control unit 33 may be combined in any combinations, or may be separate. Further, in the secondary 3b illustrated in FIG. 5, the functions of communication unit 36 and control unit 38 may be combined in any combinations, or may be separate.

Further, at least one of the buffer 23 and the devices 32 and 37 may be embodied by storage areas in a PM that can be mounted to the computer 10 (see FIG. 21) as the memory 10b and is also available as storage areas.

In one embodiment and the modification thereto, data transfers are carried out between the buffer 23 and the device 32, between the device 32 and the device 37, and between the devices 37 by means of RDMA Read or Write processes in the NVMe-oF environment. The present disclosure, however, is not limited thereto.

For example, a technique according to one embodiment and the modification thereto may be embodied by inter-memory RDMAs (data transfers) between memories such as DRAMs and PMs, instead of RDMAs between storage apparatuses such as SSDs. As an example, in a write access, the storage apparatus 3 may execute a write process to write data that has been transferred to a memory in that storage apparatus 3, for transferring the data from that memory to the device 32 or 37 using an inter-memory RDMA Read process. In a read access, the client 2 may execute a write process to write data that has been transferred to a memory in the client 2, for transferring the data from that memory to the buffer 23 using an inter-memory RDMA Write process.

In this way, the client 2 or the storage apparatuses 3 executes transfer processes including an inter-memory RDMA Read or Write process and a write process. For example, the control unit 22, 33, or 38 may issue a write command (transfer command) including an RDMA Read or Write command, and the communication unit 24, 31, or 36 may execute a transfer process according to that write command. This can provide the same effects as those of one embodiment and a modification thereto even when an inter-memory RDMA process is executed.

In one aspect, the efficiency of data accesses can be improved in a distributed storage system in which data is stored in a plurality of storage apparatuses in a distributed manner.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
a data processing apparatus; and
a plurality of storage apparatuses,
the data processing apparatus being configured to:
store, into a memory, write data to be written to a first storage apparatus of the plurality of storage apparatuses, and send, to the first storage apparatus, a first transfer request containing information indicative of a storing location of the write data in the memory, and
the first storage apparatus being configured to:
execute a first transfer process to read the write data from the storing location thereof in the memory based on the information indicative of the storing location, and write the write data to a first storage area in the first storage apparatus;
identify, based on information indicative of at least one of storage devices that are to carry out the storing of the write data, a second storage apparatus and a third storage apparatus that are to serve as transfer destinations of the write data among the plurality of storage apparatuses;
send, to the second storage apparatus among the identified transfer destinations, a second transfer request instructing a transfer of the write data from the storing location in the memory of the data processing apparatus to the second storage apparatus, the write data being stored by the data processing apparatus; and
send, to the third storage apparatus among the identified transfer destinations, a third transfer request instructing a transfer of the write data being transferred to the first storage apparatus from the memory, from the storing location of the write data in the first storage area to the third storage apparatus,
the second storage apparatus being configured to:
execute a second transfer process to read the write data from the storing location thereof in the memory based on the information indicative of the storing location contained in the second transfer request received from the first storage apparatus, and write the write data to a second storage area in the second storage apparatus, and the third storage apparatus being configured to:
execute, in parallel in time-wise with the second transfer process, a third transfer process to read the write data from the storing location thereof in the first storage area based on the information indicative of the storing location contained in the third transfer request received from the first storage apparatus, and write the write data to a third storage area in the third storage apparatus.

2. The information processing system according to claim 1, wherein
the second storage apparatus is configured to
set information indicative of completion of the second transfer process in a given area in the first storage apparatus, and
the third storage apparatus is configured to
set information indicative of completion of the third transfer process in the given area in the first storage apparatus, and
the first storage apparatus is configured to
in response to detecting completion of the second and third transfer processes, based on the information set in the given area, send a response indicating completion of a process associated with the first transfer request, to the data processing apparatus.

3. The information processing system according to claim 2, wherein
the given area comprises a plurality of areas allocated to the second and third storage apparatuses,
the second storage apparatus is configured to, upon setting the information indicative of completion of the second transfer process, write the information to an area being allocated to the second storage apparatus, and
the third storage apparatus is configured to, upon setting the information indicative of completion of the third transfer process, write the information to an area being allocated to the third storage apparatus, and
the first storage apparatus is configured to detect that the second and third transfer processes complete when the information is written to all of the areas allocated to the second and the third storage apparatuses.

4. The information processing system according to claim 2, wherein
the given area comprises an area that is common to the second and third storage apparatuses,
the second storage apparatus is configured to increase or decrease a value set in the area upon setting the information indicative of completion of the corresponding second transfer process, and
the third storage apparatus is configured to increase or decrease a value set in the area upon setting the information indicative of completion of the third transfer process, and
the first storage apparatus is configured to detect that the second and third transfer processes complete when an increased or decreased amount of the value set in the area matches a number of the second and third storage apparatuses.

5. The information processing system according to claim 1, wherein
the second storage apparatus is configured to
send, to a fourth storage apparatus of the plurality of storage apparatuses, a fourth transfer request instructing a transfer of the write data from the storing location, from which the write data has been read, to the fourth storage apparatus; and
send, to a fifth storage apparatus of the plurality of storage apparatuses, a fifth transfer request instructing a transfer of the write data from the storing location of the write data in the second storage area to the fifth storage apparatus, and
the third storage apparatus is configured to
send, to a sixth storage apparatus of the plurality of storage apparatuses, a sixth transfer request instructing a transfer of the write data from the storing location, from which the write data has been read, to the sixth storage apparatus; and
send, to a seventh storage apparatus of the plurality of storage apparatuses, a seventh transfer request instructing a transfer of the write data from the storing location of the write data in the third storage area to the seventh storage apparatus.

6. The information processing system according to claim 1, wherein at least one of the first transfer process, the second transfer process and the third transfer process is a Remote Direct Memory Access (RDMA) Read process.

7. A non-transitory computer-readable recording medium having stored therein a storage controlling program that causes a computer operating a first storage apparatus, to execute a process comprising:
receiving, from a data processing apparatus comprising a memory provided in an information processing system comprising the data processing apparatus and a plurality of storage apparatuses comprising the first storage apparatus, a first transfer request containing information indicative of a storing location in the memory of write data to be written to the first storage apparatus;
executing a first transfer process to read the write data from the storing location thereof in the memory based on the information indicative of the storing location, and write the write data to a first storage area in the first storage apparatus;
identifying, based on information indicative of at least one of storage devices that are to carry out the storing of the write data, a second storage apparatus and a third storage apparatus that are to serve as transfer destinations of the write data among the plurality of storage apparatuses;
sending, to the second storage apparatus among the identified transfer destinations, a second transfer request instructing a transfer of the write data from the storing location in the memory of the data processing apparatus to the second storage apparatus, the write data being stored by the data processing apparatus; and
sending, to the third storage apparatus among the identified transfer destinations, a third transfer request instructing a transfer of the write data being transferred to the first storage apparatus from the memory, from the storing location of the write data in the first storage area to the third storage apparatus
the second transfer request causes the second storage apparatus to execute a second transfer process to read the write data from the storing location thereof in the memory based on the information indicative of the storing location contained in the second transfer request received from the first storage apparatus, and write the write data to a second storage area in the second storage apparatus, and
the third transfer request causes the third storage apparatus to execute, in parallel in time-wise with the second transfer process, a third transfer process to read the write data from the storing location thereof in the first storage area based on the information indicative of the storing location contained in the third transfer request received from the first storage apparatus, and write the write data to a third storage area in the third storage apparatus.

8. The non-transitory computer-readable recording medium according to claim 7, wherein the program causes the computer to execute a process comprising in response to detecting completion of the second and third transfer processes, based on information set in a given area to which information indicative of completion of the transfer process is set by the second and third storage apparatuses, sending a response indicating completion of a process associated with the first transfer request, to the data processing apparatus.

9. The non-transitory computer-readable recording medium according to claim 8, wherein the given area comprises a plurality of areas allocated to the second and third storage apparatuses, and the detecting comprises detecting that the second and third transfer processes complete when the information is written to all of the areas allocated to the second and third storage apparatuses.

10. The non-transitory computer-readable recording medium according to claim 8, wherein the given area comprises an area that is common to the second and third storage apparatuses, and that contains a value that is increased or decreased by the second and third storage apparatuses, and the detecting comprising detecting that the second and third transfer processes complete when an increased or decreased amount of the value set in the area matches a number of the second and third storage apparatuses.

11. A storage controller configured to control a first storage apparatus, comprising:

a first memory; and a processor coupled to the first memory, the processor being configured to:

receive, from a data processing apparatus comprising a second memory provided in an information processing system comprising the data processing apparatus and a plurality of storage apparatuses comprising the first storage apparatus, a first transfer request containing information indicative of a storing location in the second memory of write data to be written to the first storage apparatus;

execute a first transfer process to read the write data from the storing location thereof in the second memory based on the information indicative of the storing location, and write the write data to a first storage area in the first storage apparatus;

identify, based on information indicative of at least one of storage devices that are to carry out the storing of the write data, a second storage apparatus and a third storage apparatus that are to serve as transfer destinations of the write data among the plurality of storage apparatuses;

send, to the second storage apparatus among the identified transfer destinations, a second transfer request instructing a transfer of the write data from the storing location in the memory of the data processing apparatus to the second storage apparatus, the write data being stored by the data processing apparatus; and send, to the third storage apparatus among the identified transfer destinations, a third transfer request instructing a transfer of the write data being transferred to the first storage apparatus from the memory, from the storing location of the write data in the first storage area to the third storage apparatus, the second transfer request causes the second storage apparatus to execute a second transfer process to read the write data from the storing location thereof in the second memory based on the information indicative of the storing location contained in the second transfer request received from the first storage apparatus, and write the write data to a second storage area in the second storage apparatus, and the third transfer request causes the third storage apparatus to, in parallel in time-wise with the second transfer process, a third transfer process to read the write data from the storing location thereof in the first storage area based on the information indicative of the storing location contained in the third transfer request received from the first storage apparatus, and write the write data to a third storage area in the third storage apparatus.

12. The storage controller according to claim 11, further comprising:

a given area to which information indicative of completion of the transfer process is set by the second and third storage apparatuses, wherein the processor is configured to in response to detecting completion of the second and third transfer processes, based on the information set in the given area, send a response indicating completion of a process associated with the first transfer request, to the data processing apparatus.

13. The storage controller according to claim 12, wherein the given area comprises a plurality of areas allocated to the second and third storage apparatuses, and the processor is configured to detect that the second and third transfer processes complete when the information is written to all of the areas allocated to the second and third storage apparatuses.

14. The storage controller according to claim 12, wherein the given area comprises an area that is common to the second and third storage apparatuses, and that contains a value that is increased or decreased by the second and third storage apparatuses, and the processor is configured to detect that the second and third transfer processes complete when an increased or decreased amount of the value set in the area matches a number of the second and third storage apparatuses.

* * * * *